US006496204B1

United States Patent
Nakamura

(10) Patent No.: US 6,496,204 B1
(45) Date of Patent: Dec. 17, 2002

(54) METHOD AND APPARATUS OF DISPLAYING OBJECTS ON CLIENT AREAS AND DISPLAY DEVICE USED THEREFOR

(75) Inventor: Koichi Nakamura, Machida (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/401,456

(22) Filed: Sep. 22, 1999

(30) Foreign Application Priority Data

Sep. 22, 1998 (JP) .......................................... 10-267634

(51) Int. Cl.⁷ ................................................ G06F 3/14
(52) U.S. Cl. ....................................... 345/781; 345/788
(58) Field of Search ................................ 345/781, 784, 345/788, 803, 804

(56) References Cited

U.S. PATENT DOCUMENTS

| | | | |
|---|---|---|---|
| 5,266,932 A | 11/1993 | Tokumitsu | 345/123 |
| 5,485,174 A | 1/1996 | Henshaw et al. | 345/123 |
| 5,847,706 A | * 12/1998 | Kingsley | 345/788 |
| 6,011,549 A | * 1/2000 | Shoji et al. | 345/784 |
| 6,023,275 A | * 2/2000 | Hovitz et al. | 345/788 |
| 6,252,594 B1 | * 6/2001 | Xia et al. | 345/784 |

FOREIGN PATENT DOCUMENTS

| | | |
|---|---|---|
| EP | 0 561 076 B1 | 9/1992 |
| GB | 2 237 486 A | 9/1990 |
| JP | 8-137656 | 5/1996 |

* cited by examiner

Primary Examiner—Cao H. Nguyen
(74) Attorney, Agent, or Firm—Ryan, Mason & Lewis, LLP; Louis J. Percello

(57) ABSTRACT

A method and apparatus are disclosed for displaying an object in a plurality of independent client areas where the relationship among the objects displayed in a plurality of client areas can be easily understood at a glance. In a display method in which a plurality of independent client areas exist and at least one of the client areas independently scrolls, this invention relates to a method of displaying a relationship between objects displayed in a plurality of client areas the relative position of which is changed by scrolling a client area. A first aspect of the invention relates to displaying by following the movement caused by scrolling. A second aspect of the invention relates to displaying by enlarging the object by the amount of movement caused by scrolling. A third aspect of the invention relates to displaying by marking a junction between objects in scrolling. In either case, correlation of objects displayed in a plurality of client areas can be visually understood at a glance easily. The display method is implemented by a display device comprising an overall control part, a client area control part and control parts for various figures.

22 Claims, 25 Drawing Sheets

FIG. 2

| CLIENT AREA | 1 | 2 | 3 | ... |
|---|---|---|---|---|
| CLIENT AREA ID | $C_1$ | $C_2$ | $C_3$ | ... |
| CLIENT AREA SIZE | $L_1, T_1, W_1, H_1$ | $L_2, T_2, W_2, H_2$ | $L_3, T_3, W_3, H_3$ | ... |

CLIENT AREA SIZE:  
L ··· UPPER LEFT CORNER X COORDINATE  
T ··· UPPER LEFT CORNER Y COORDINATE  
W ··· WIDTH  
H ··· HEIGHT

FIG. 3

| RENDERING OBJECT | | 1 | 2 | 3 | ... |
|---|---|---|---|---|---|
| KIND OF OBJECT (LINE, RECTANGLE, etc.) | | $O_1$ | $O_2$ | $O_3$ | ... |
| METHOD OF EXPRESSION (1, 2, 3) | | $E_1$ | $E_2$ | $E_3$ | ... |
| NO. OF CLIENT AREAS SPANNED ACROSS | | $N_1$ | $N_2$ | $N_3$ | ... |
| NO. OF CLIENT AREAS ID LIST SPANNED ACROSS | | $C_{1a}, C_{1b}, ...$ | $C_{2a}, C_{2b}, ...$ | $C_{3a}, C_{3b}, ...$ | ... |
| SCROLL POSITION LIST OF CLIENT AREAS SPANNED ACROSS | HORIZONTAL SCROLL | $h^X_{1a}, h^X_{1b}, ...$ | $h^X_{2a}, h^X_{2b}, ...$ | $h^X_{3a}, h^X_{3b}, ...$ | ... |
| | VERTICAL SCROLL | $v^Y_{1a}, v^Y_{1b}, ...$ | $v^Y_{2a}, v^Y_{2b}, ...$ | $v^Y_{3a}, v^Y_{3b}, ...$ | ... |
| ID OF CLIENT AREA INCLUDING STARTING POINT | | $b^C_1$ | $b^C_2$ | $b^C_3$ | ... |
| ID OF CLIENT AREA INCLUDING END POINT | | $e^C_1$ | $e^C_2$ | $e^C_3$ | ... |
| STARTING POINT | X | $b^X_1$ | $b^X_2$ | $b^X_3$ | ... |
| | Y | $b^Y_1$ | $b^Y_2$ | $b^Y_3$ | ... |
| END POINT | X | $e^X_1$ | $e^X_2$ | $e^X_3$ | ... |
| | Y | $e^Y_1$ | $e^Y_2$ | $e^Y_3$ | ... |

SCROLL POSITION: CURRENT POSITION OF SCROLL BOX
STARTING/END POINTS: RELATIVE POSITION FROM A REFERENCE POINT WHICH CORRESPONDS TO UPPER LEFT CORNER AT THE TIME WHEN CLIENT AREA IS NOT SCROLLED AT ALL

METHOD AND APPARATUS OF DISPLAYING OBJECTS ON CLIENT AREAS AND DISPLAY DEVICE USED THEREFOR

FIELD OF THE INVENTION

The present invention relates generally to a method and apparatus for displaying an object and, more particularly, to a method and apparatus for displaying an object in a plurality of independent client areas where at least one of the client areas independently scrolls for allowing the relationship among the objects, the relative position of which is changed by a scroll of a client area, to be visually easily understood while they are displayed in a plurality of client areas.

BACKGROUND OF THE INVENTION

Various applications have been heretofore used in which a plurality of independent client areas exist and at least one of the client areas independently scrolls. FIG. 21 shows an example of a display screen of such applications in which a client area A is provided in parallel with a client area B and scroll bars 50A, 50B are provided in each client area. Generally, the scroll bars 50A, 50B are generated by a function of an operating system when the client areas A, B are smaller than a logical display area 51. As shown in FIG. 21, when a plurality of independent client areas exist, it is desired to display a point or an area in the client area A in correlation to a point or an area in the client area B.

In such case, it is necessary to display an object such as a line connecting related points, or a figure including a rectangle, a circle and an ellipse encompassing related areas across the client areas A and B. It may be also necessary to display an object of an image or a character string across the client areas A and B. FIG. 22(*a*) shows an example in which related points are connected by a line. FIG. 23(*a*) shows an example of a rectangle encompassing related areas. FIG. 24(*a*) shows an example of displaying with an image. FIG. 25(*a*) shows an example of displaying a character string.

When a correlation between the client area A and the client area B is displayed by an object, the correlation can be visually understood at a glance. However, if a client area, for example, the client area B, is scrolled, the position of the object within the client area B moves and the relative position of the object within the client area A to the object within the client area B changes.

As an example of a case where an object is offset at the boundary of the client areas A and B by scrolling the client area B, FIG. 22(*b*) shows an example in which related points are connected by a line, FIG. 23(*b*) shows an example of a rectangle encompassing related areas, FIG. 24(*b*) shows an example of displaying with an image, and FIG. 25(*b*) shows an example of displaying a character string. In these examples, an object in the client area A and an object in the client area B are offset at the boundary between the client area A and the client area B, inviting a problem that a correlation can not be shown. Further, in an extreme case, there was a problem that an object in the client area A and an object in the client area B showed a wrong correlation or a wrong meaning.

In order to solve such problem, it may be conceived to render related objects among objects lying across a plurality of client areas in a same color or to flash such related objects. However, it is a problem that the original color changes when related objects are rendered in a same color. In addition, it is a problem that the number of objects increases when related objects are flashed. Therefore, none of the above solution could be a radical solution to solve the above problem.

A need therefore exists for a method of displaying objects displayed in a plurality of client areas in which a relationship between such objects can be easily understood at a glance without changing an original color or flashing, and a display device used therefor.

SUMMARY OF THE INVENTION

The inventive method of displaying objects in a plurality of client areas relate to a method in which a plurality of independent client areas exist and at least one of the client areas independently scrolls and particularly to a method of displaying a relationship between objects displayed in a plurality of client areas the relative position of which is changed by scrolling a client area. In a first aspect of the invention, an object is displayed by following the movement caused by scrolling. In a second aspect of the invention, an object is displayed by enlarging the object by the amount of movement caused by scrolling. In a third aspect of the invention, an object is displayed by marking a junction between objects in scrolling. In either case, correlation of objects displayed in a plurality of client areas can be visually understood at a glance easily.

In one preferred embodiment, when a plurality of objects exist and scrolling causes the objects to be crossed relative to each other, the objects are displayed with a space placed at the point of crossing or by a mark which indicates that objects are crossing while, when a plurality of objects exist and scrolling causes the objects to be overlapped with each other, the objects are displayed with the overlapped portion offset. In either case, a complex image is preferably displayed legibly.

In another preferred embodiment, the objects return to the initial display assuming at the time when the scroll position of an object is correlated by clicking a part of the object. This is preferable because the position and the shape of an object which goes out of a client area by scrolling over a large extent can be simply returned to the original position and shape.

The inventive display device for displaying an object displayed in a plurality of client areas comprises an overall control part including a client area managing part and a rendering object managing part, client area control parts provided corresponding, in number, to the number of the client areas and each having an external event input part and a position calculating part, and a control part for various figures having rendering/output parts for respective figures. In the display device of the above described configuration, each position calculating part recalculates the rendering position of an object in each client area with reference to client area managing information from the client area managing part and rendering object managing information from the rendering object managing part based on an external event inputted in the external event input part and causes the rendering/output part to display a rendering object in each client area based on the calculated rendering position of the object. The above described display method of this invention can be thus preferably implemented.

A more complete understanding of the present invention, as well as further features and advantages of the present invention, will be obtained by reference to the following detailed description and drawings.

BRIEF DESCRIPTION OF THE DRAWINGS

FIG. 2 is a diagram showing a configuration of an example of the client area managing table;

FIG. 3 is a diagram showing the configuration of an example of the rendering object managing table;

DETAILED DESCRIPTION OF PREFERRED EMBODIMENTS

Figure 1:
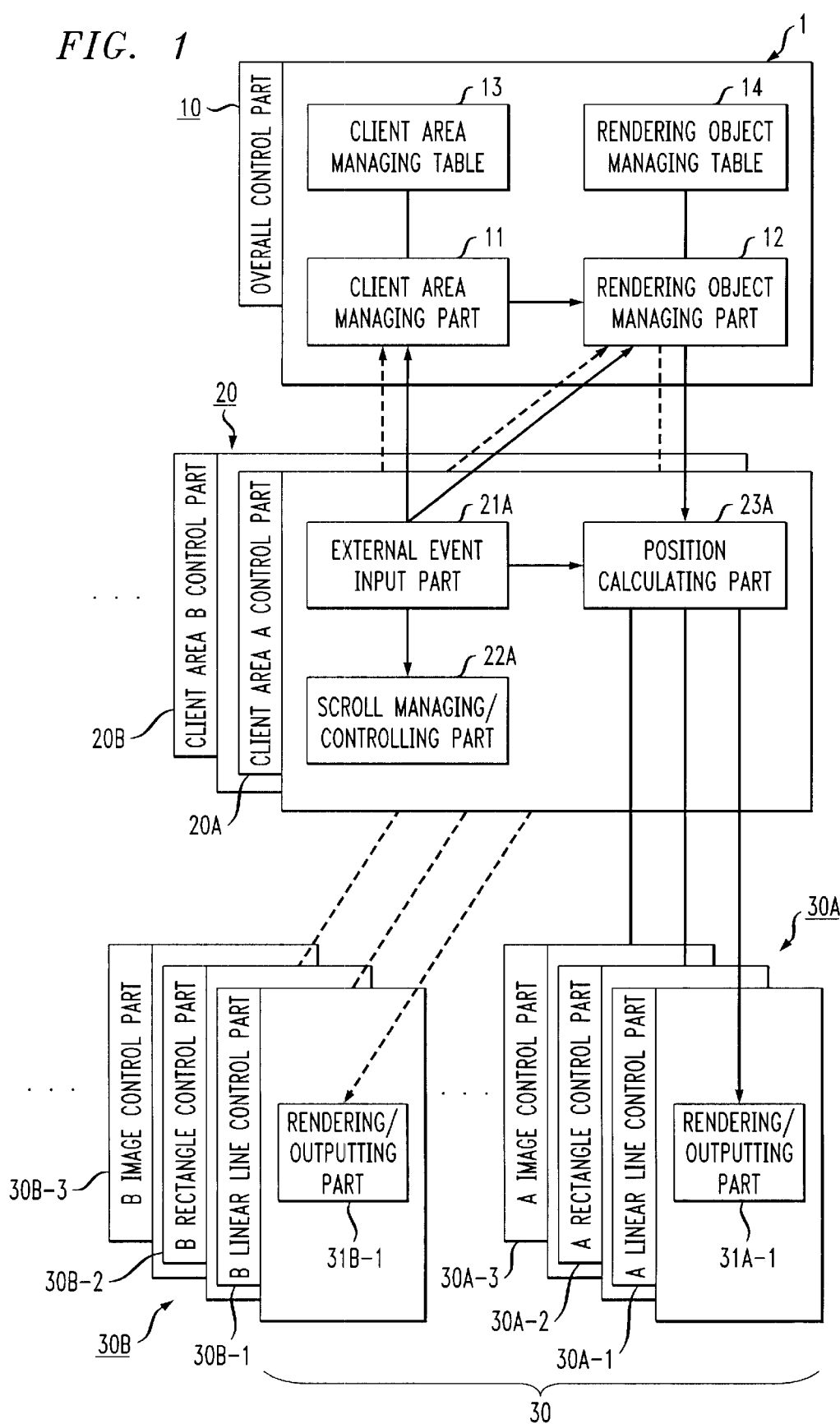
FIG. 1 is a block diagram showing an overall configuration of an example of the display device of this invention for displaying an object displayed in a plurality of client areas.

FIG. 1 is a block diagram showing an overall configuration of an example of the display device of this invention for displaying an object displayed in a plurality of client areas. In the following description, an example of an object lying across a plurality of client areas is described as an object displayed in a plurality of client areas. As conventionally seen, there are scroll bars in the client areas A and B. The scroll bars are generated by a function of an operating system when the client areas A and B are smaller than a logical display area. In the example shown in FIG. 1, the display device 1 of this invention is provided with an overall control part 10, a client area control part 20 and a control part 30 for various figures. The overall control part 10 is provided with a client area managing part and a rendering object managing part 12. Client area information managed by the client area managing part 11 is stored in a client area managing table 13. Rendering object information managed by the rendering object managing part 12 is stored in a rendering object managing table 14.

The client area control part 20 comprises a client area A control part 20A, a client area B control part 20B, through a client area N control part 20N which are provided corresponding to the number of client areas (the number is assumed to be N here). The client area A control part 20A comprises an external event input part 21A, a scroll managing/controlling part 22A and a position calculating part 23A. Similarly, other client area B control part 20B, through client area N control part 20N comprise external event input parts 21B through N, scroll managing/controlling parts 22B through N and position calculating parts 23B through N.

The control part 30 for figures comprises a figure control part 30A of the client area A, through a figure control part 30N of the client area N provided corresponding, in number, to the number of the client areas. The figure control part 30A of the client area A comprises a linear line control part 30A-1, a rectangle control part 30A-2 and an image control part 30A-3 provided for a linear line, a rectangle and an image. Similarly, figure control part 30B through 30N of the client areas B through N comprise linear line control part 30B-1 through 30N-1, rectangle control parts 30B-2 through 30N-2 and image control parts 30B-3 through 30N-3 provided for a linear line, a rectangle and an image, respectively. In each figure control part 30A through 30N, the linear line control parts 30A-1 through 30N-1, rectangle control parts 30A-2 through 30N-2 and image control parts 30A-3 through 30N-3 are provided with rendering/output parts 31A-1 through 31N-1, respectively. In the above described display device 1, relationship among the components is as shown by arrow heads and solid lines.

FIG. 2 is a diagram showing a configuration of an example of the client area managing table 13. In the example shown in FIG. 2, the client area managing table 13 comprises a client area, a client area ID and a client area size. A numeral corresponding to the number of client areas which a user is to use is stored in the client area. A different ID is stored for different client area in the client area ID. An upper left corner X coordinate (L), an upper left corner Y coordinate (T), a width (W) and a height (H) are stored in the client area size.

FIG. 3 is a diagram showing the configuration of an example of the rendering object managing table 14. In the example shown in FIG. 3, the rendering object managing table 14 comprises a rendering object, the kind of the object, method of expression, the number of client areas spanned across, an ID list of the client areas spanned across, a scroll position list of the client areas spanned across (horizontal scroll, vertical scroll), an ID of a client area including a starting point, an ID of a client area including an end point, a starting point (X,Y) and an end point (X,Y).

Figure 4:
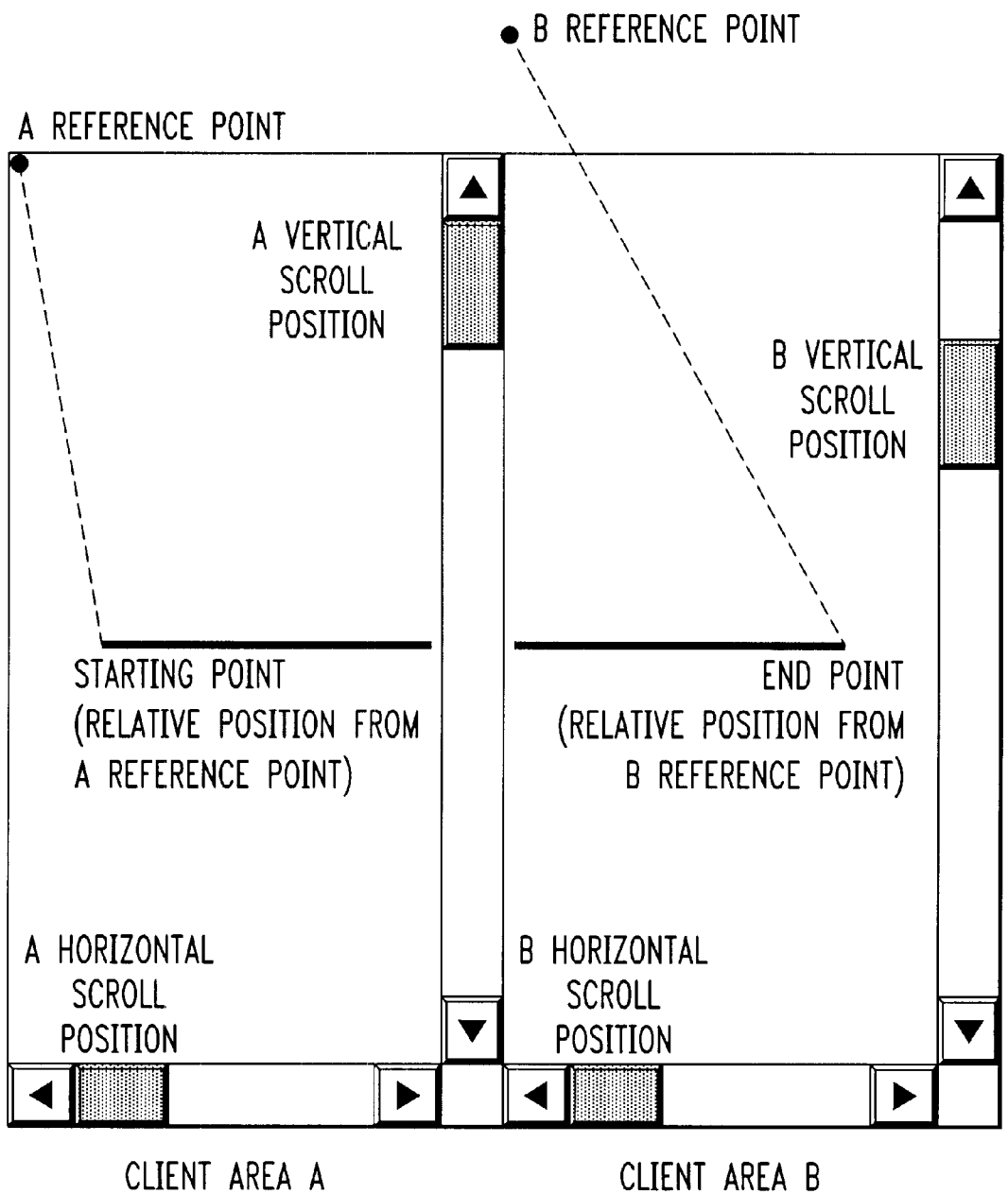
FIG. 4 is a diagram showing a concept of the scroll position, the starting point and the end point.

A numeral corresponding to the number of objects which the user is to use is stored in the rendering object. When the user generates a new rendering object in a client area, the data of the rendering object is added to the rendering object managing table 14. The kind of object figure predefined by the user such as a line, a rectangle, etc., is stored in the kind of object. The kind of method of expressing an object which is predefined by the user, specifically, a choice of the first invention, the second invention or the third invention in the display method of this invention to be described later in detail, is stored in the method of expression. The number of client areas across which each object spans is stored in the number of client areas spanned across. ID's of client areas across which each object spanns is stored in a list in the ID list of client areas spanned across. Each client area spanning across X and Y coordinates of the current position of the scroll box is stored in a list in the scroll position list (horizontal scroll, vertical scroll) of client areas spanned across. An ID of an client area in which the starting point of each object exists is stored in the ID of client area including a starting point. An ID of an client area in which the end point of each object exists is stored in the ID of client area including an end point. A relative position of each object from a reference point of the starting and end point is stored in the starting point (X, Y) and the end point (X, Y), with reference point being the upper left corner of the client area assuming when it is not scrolled at all. FIG. 4 shows a concept of the scroll position, the starting point and the end point described in the above.

The inventive method of displaying an object spanning across a plurality of client areas is now described in the aspect of a general flow of executing the method in the display device 1 shown in FIG. 1. In the display device 1 of the configuration shown in FIG. 1, the external event input parts 21A through 21N detect an external event inputted in either of the client areas and deliver the detected external event to the client area managing part 11 and the rendering object managing part 12. The client area managing part 11 supplies client area managing information stored in the client area managing table 13 to the rendering object managing part 12. The rendering object managing part 12 determines the client area across which the object spanns based on the supplied client area managing information and rendering object managing information stored in the rendering object managing table 14 and supplies the client area managing information and the rendering object managing information to the position calculating part 23A through 23N of each of the determined client areas. The position calculating part 23A through 23N of each client area recalculates the rendering position of the object in each client area based on the supplied client area managing information and the rendering object managing information. The rendering object is displayed in each client area by the rendering/output parts 3 1A-3 through 3 1N-3 based on the calculated rendering position of the object. By executing the above operation each time an external event is generated, the display method of this invention can be practiced.

A specific example of the inventive method of displaying an object spanning across a plurality of client areas is now described with reference to the drawings. The inventive method of displaying objects in a plurality of client areas relate to an application in which a plurality of independent client areas exist and each client area independently scrolls and particularly to a method of displaying a relationship between objects spanning across a plurality of client areas the relative position of which is changed by scrolling a client area.

Figure 5:
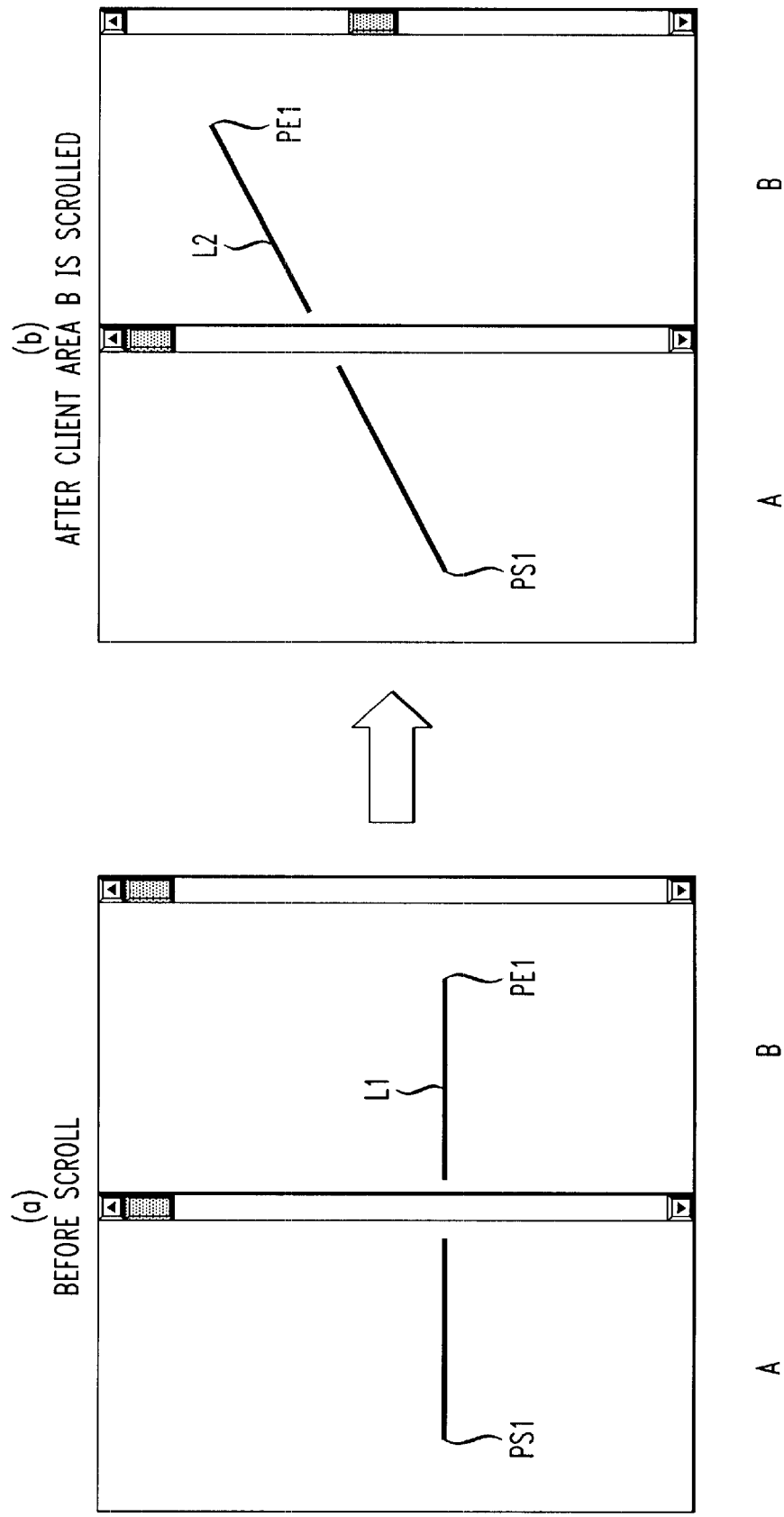
FIG. 5 is a diagram showing an example in which an object spanning across a plurality of client areas is a line connecting related points.
Figure 6:
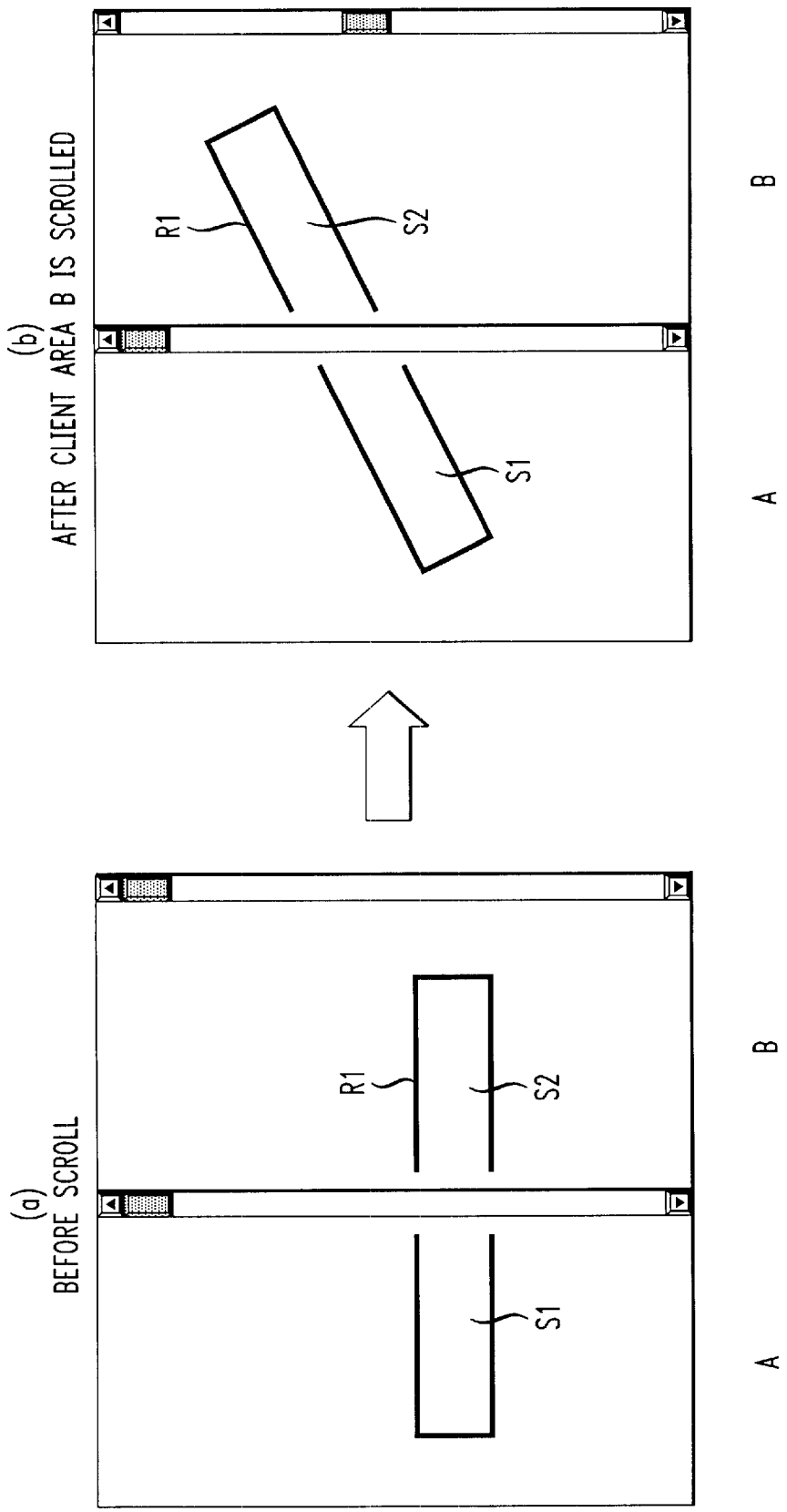
FIG. 6 is a diagram showing an example in which an object spanning across a plurality of client areas is a figure encompassing related areas.
Figure 7:
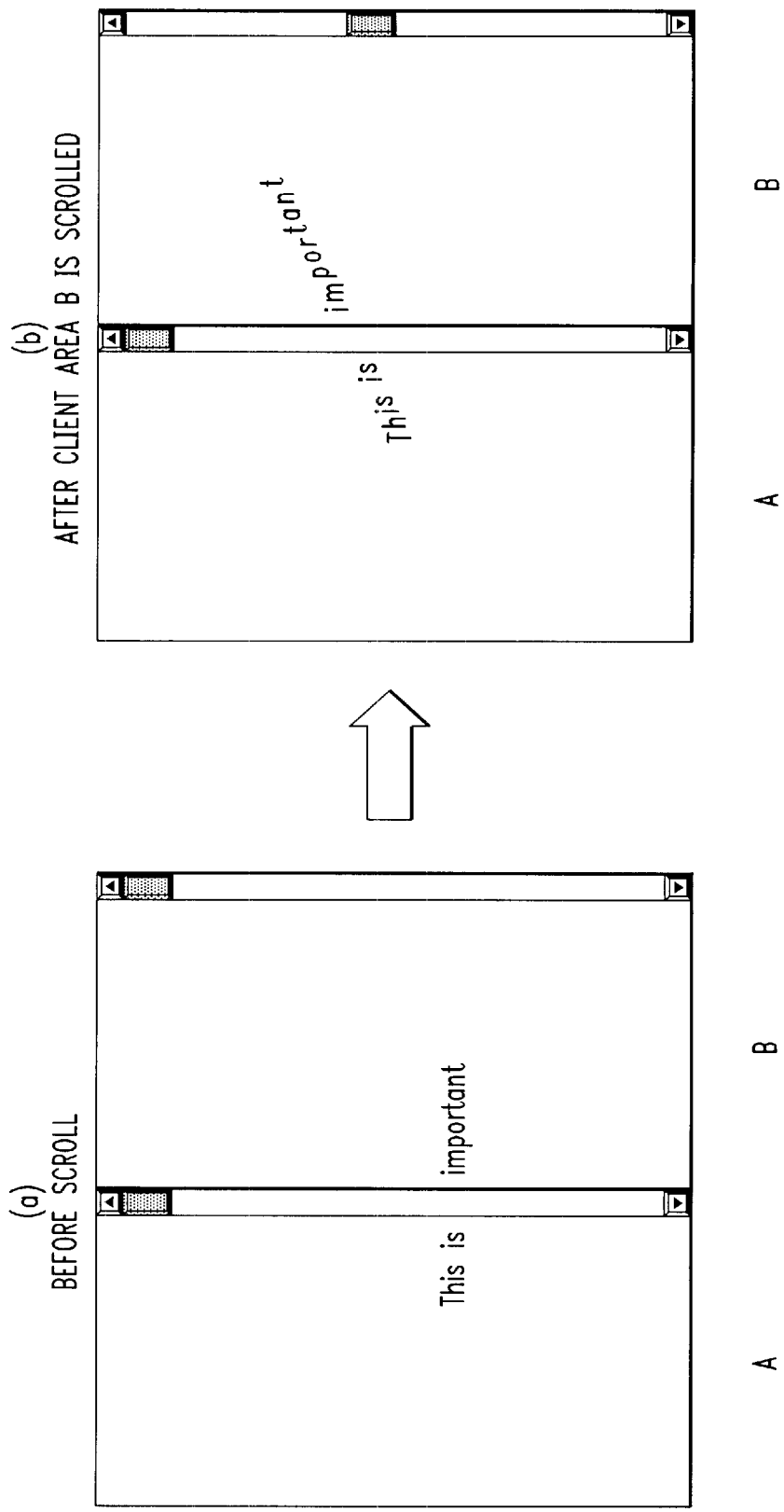
FIG. 7 is a diagram showing an example in which an object spanning across a plurality of client areas is a character string.

The first invention of the inventive display method displays an object by following the movement caused by scrolling. FIG. 5 through FIG. 7 are diagrams showing the first invention of the inventive display method. FIG. 5 shows an example in which an object spanning across a plurality of client areas is a line connecting related points. Specifically, a starting point PS1 of the client area A has a certain relevance with the an end point PE1 of the client area B and the starting point PS1 and the end point PE1 are displayed with a line L1 connecting them. The state before being scrolled is shown in FIG. 5(a) while the state after being scrolled is shown in FIG. 5(b). As seen from FIG. 5(a) and (b), the line L1 inclines in correspondence to the amount of scroll of the client area B. The relationship between the starting point PS1 of the client area A and the end point PE1 of the client area B can thus be easily understood despite scrolling of the client area.

FIG. 6 shows an example in which an object spanning across a plurality of client areas is a figure encompassing related areas. Specifically, an area S1 of the client area A and an area S2 of the client area B have a certain correlation each other and are displayed with a rectangle R1 encompassing the areas S1 and S2. The state before being scrolled is shown in FIG. 6(a) while the state after the client area B is scrolled is shown in FIG. 6(b). As seen from FIGS. 6(a) and (b), the rectangle R1 inclines in correspondence to the amount of scroll of the client area B. The relationship between the area S1 of the client area A and the area S2 of the client area B can thus be easily understood despite scrolling of the client area.

FIG. 7 shows an example in which an object spanning across a plurality of client areas is a character string. The state before the client area B is scrolled is shown in FIG. 7(a) while the state after the client area B is scrolled is shown in FIG. 7(b). As seen from FIGS. 7(a) and (b), the character string inclines in correspondence to the amount of scroll of the client area B. The meaning of the character string can thus be easily understood despite scrolling of the client area.

Figure 8:
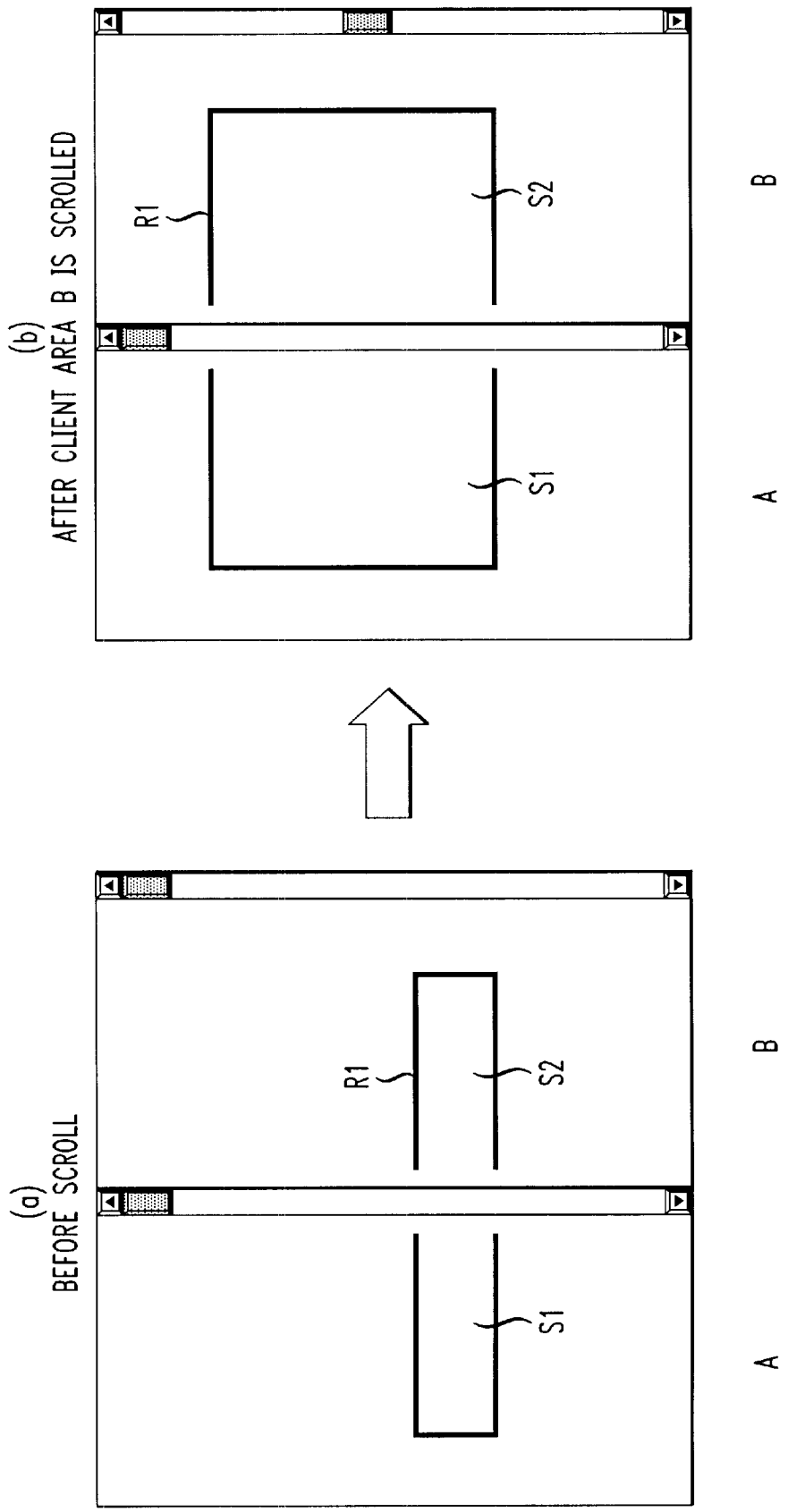
FIG. 8 is a diagram showing an example in which an object spanning across a plurality of client areas is a figure encompassing related areas in the second invention of the inventive display method.

The second invention of the inventive display method displays an object by enlarging or reducing the object by the amount of movement due to a scrolling. FIG. 8 is a diagram showing the second invention of the inventive display method. FIG. 8 shows an example in which an object spanning across a plurality of client areas is a FIG. encompassing areas. Specifically, an area S1 of the client area A and an area S2 of the client area B have a certain correlation each other and are displayed with a rectangle R1 encompassing the areas S1 and S2. The state before being scrolled is shown in FIG. 8(a) while the state after the client area B is scrolled is shown in FIG. 8(b). As seen from FIGS. 8 (a) and (b), the rectangle R1 is enlarged by the amount of movement due to the scrolling of the client area B. Therefore, the area S1 of the client area A and the area S2 of the client area B will be encompassed at least by the enlarged rectangle R1. This is true for the case of reduction. The relationship between the area S1 of the client area A and the area S2 of the client area B can thus be easily understood despite scrolling of the client area.

Figure 9:
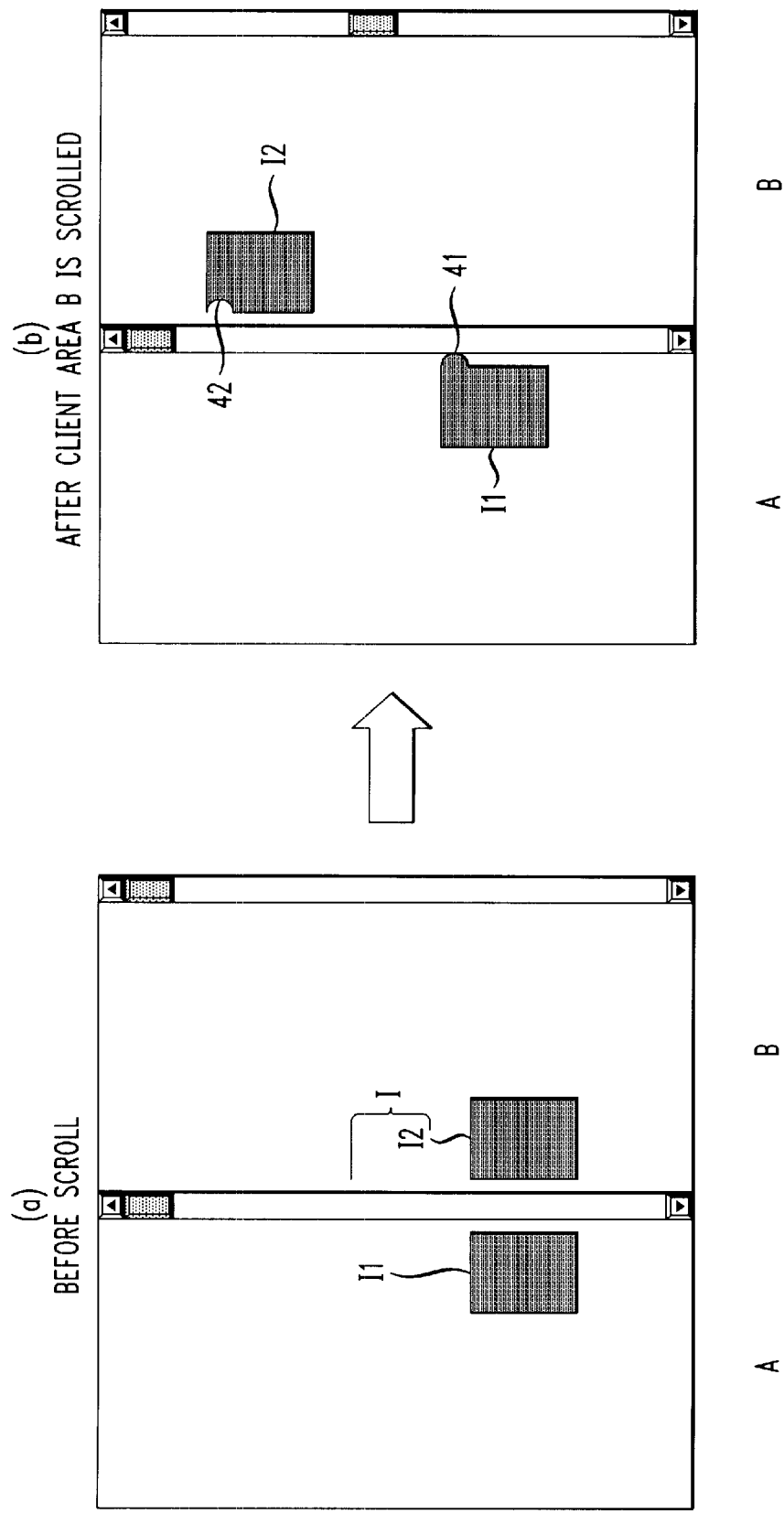
FIG. 9 is a diagram showing an example in which an object spanning across a plurality of client areas is an image in the third invention of the inventive display method.
Figure 10:
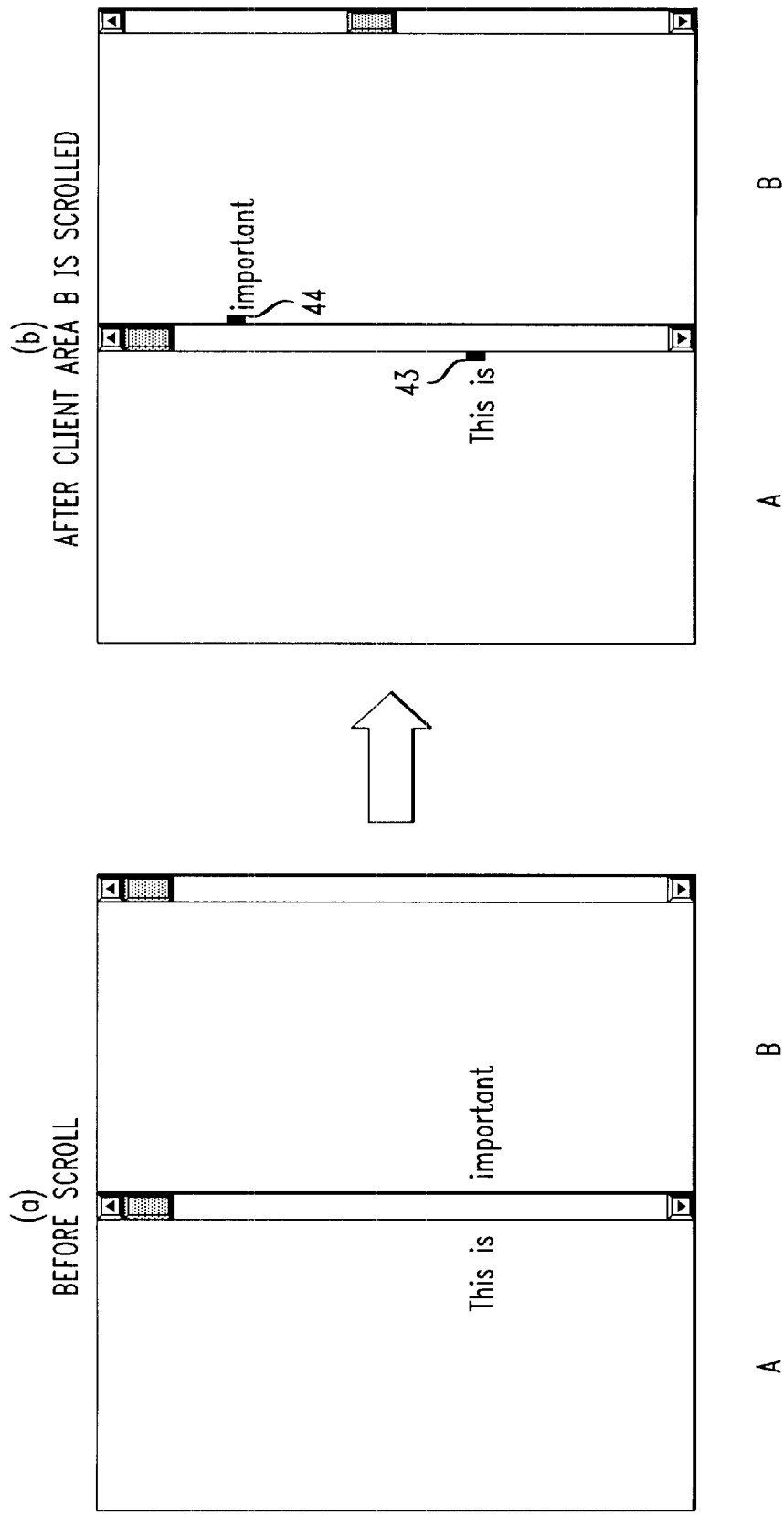
FIG. 10 shows an example in which an object spanning across a plurality of client areas is a character string.
Figure 11:
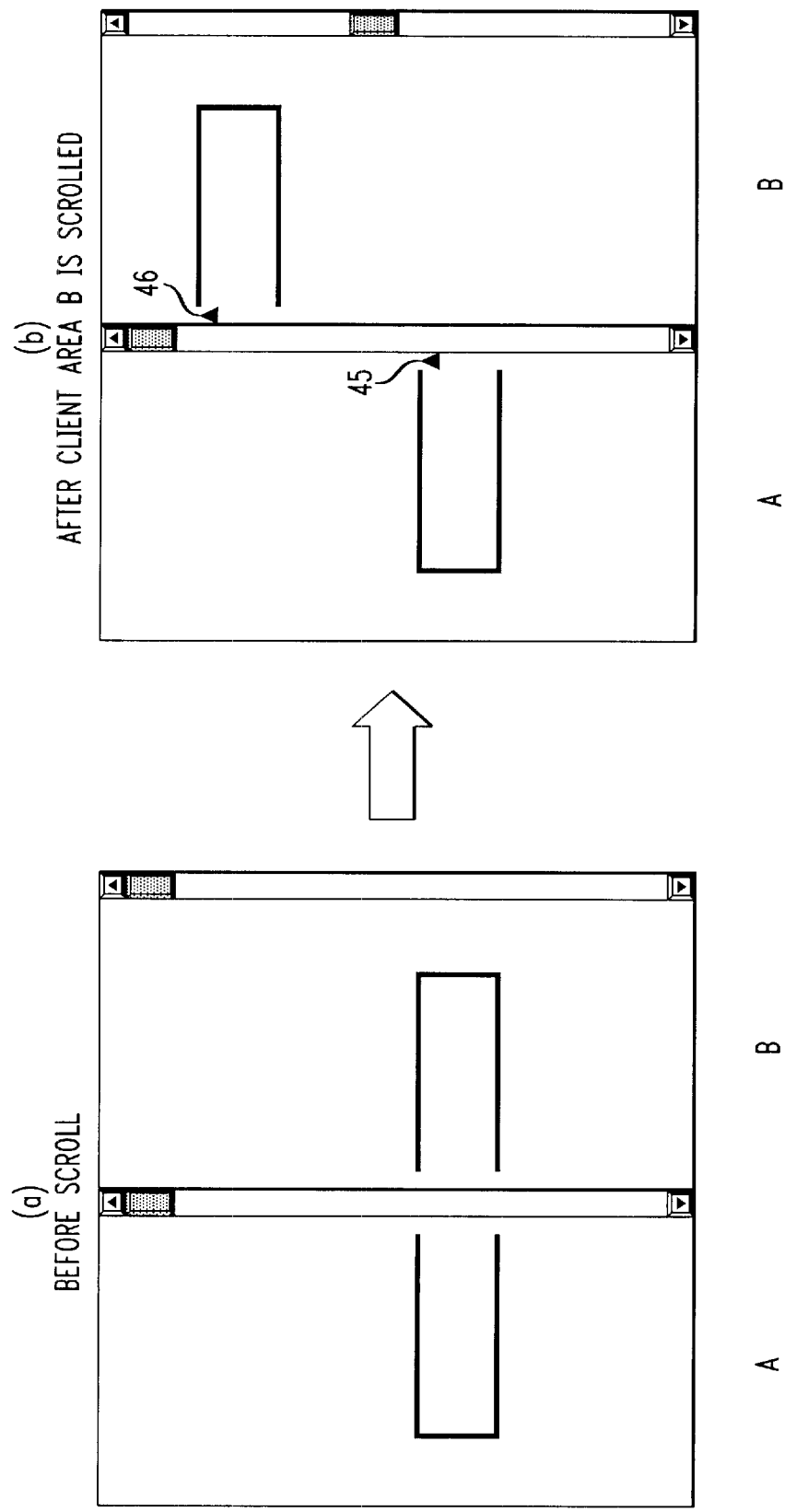
FIG. 11 shows an example in which an object spanning across a plurality of client areas is a figure encompassing related areas.

The third invention of the inventive display method displays an object by marking a junction between objects in scrolling. FIG. 9 through FIG. 11 are diagrams showing the third invention of the inventive display method. FIG. 9 shows an example in which an object spanning across a plurality of client areas is an image I consisting of an image I1 of the client area A and an image I2 of the client area B. In this case, the images I1 and I2 are displayed with a convex 41 affixed to the image I1 and a concave 42 affixed to the image I2 at the junction of the images I1 and I2. The convex 41 and the concave 42 are of a shape which match each other. The state before being scrolled is shown in FIG. 9(a) while the state after the client area B is scrolled is shown in FIG. 9(b). As seen from FIGS. 9(a) and (b), even if the image I1 is disjoined from the image I2 at the junction, it can be easily understood by the convex 41 and the concave 42 that the image I1 and the image I2 are correlated each other.

FIG. 10 shows an example in which an object spanning across a plurality of client areas is a character string. In this case, the object is displayed with a line of a same color affixed to the junction between characters, specifically, with a line 43 affixed to the junction of characters of the client area A and a line 44 affixed to the junction of characters of the client area B. The state before being scrolled is shown in FIG. 10(a) while the state after the client area B is scrolled is shown in FIG. 10(b). As seen from FIGS. 10(a) and (b), even if the character string is disjoined at the junction by scrolling the client area B, the character string can be easily understood by the lines 43 and 44 of the same color.

FIG. 11 shows an example in which an object spanning across a plurality of client areas is a figure encompassing related areas (a rectangle here). In this case, the object is displayed with a mark of same color and shape affixed to the junction between the rectangles, specifically, with a triangular mark 45 affixed to the junction of the rectangle of the client area A and a triangular mark 46 affixed to the junction of rectangle of the client area B. The state before being scrolled is shown in FIG. 11(a) while the state after scrolling the client area B is shown in FIG. 11(b). As seen from FIGS. 11(a) and (b), even if the rectangle is disjoined at the junction by scrolling the client area B, the correlation between the rectangles can be easily understood by the marks 45 and 46 of the same color and shape.

Figure 12:
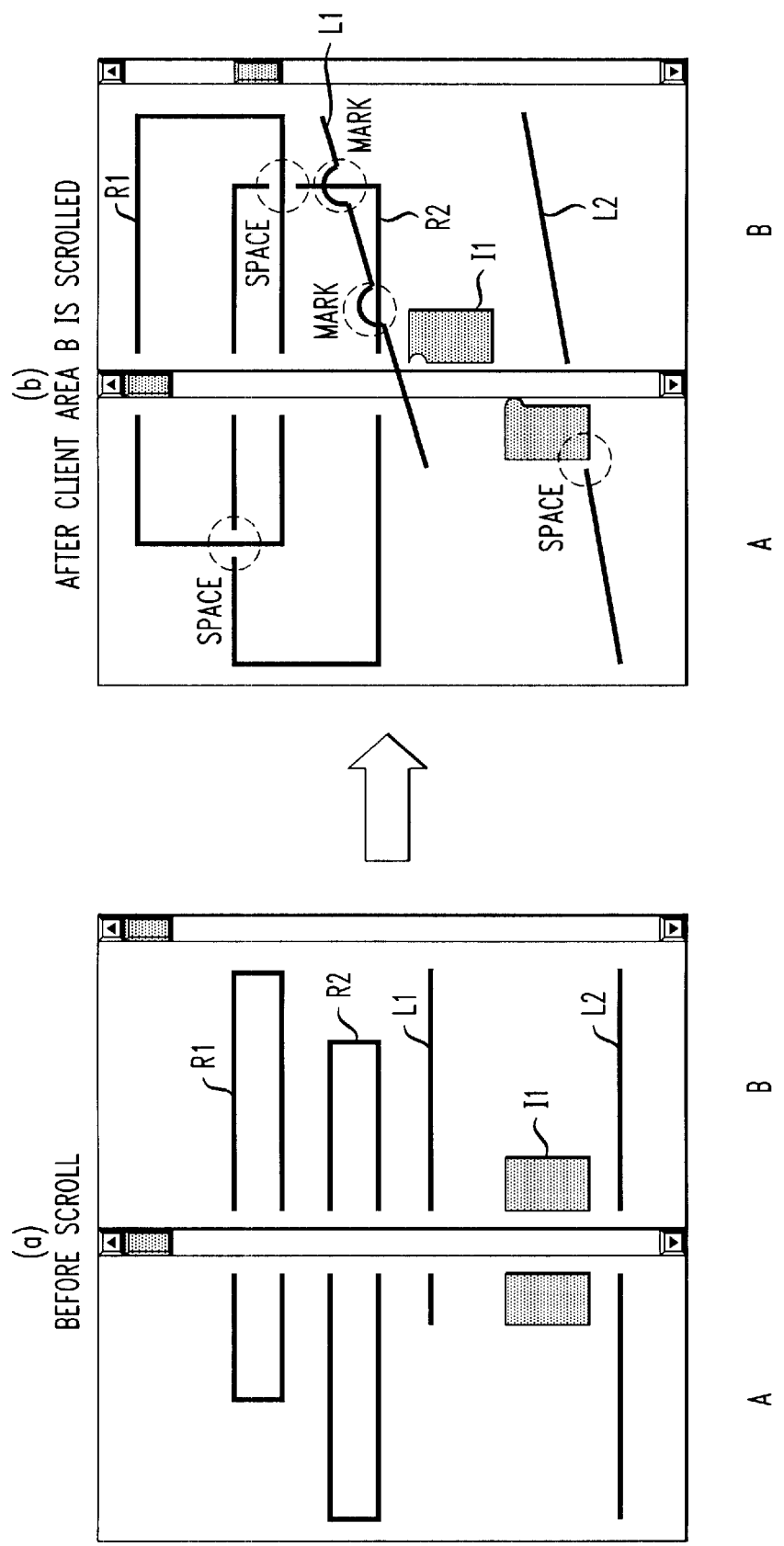
FIG. 12 shows an example in which a plurality of objects spanning across a plurality of client areas exist and crosses each other.

A case where a plurality of objects which span across a plurality of client areas is now described hereunder. FIG. 12 shows an example in which a plurality of objects cross each other. The state before being scrolled is shown in FIG. 12(a) while the state after scrolling the client area B is shown in FIG. 12(b). In FIGS. 12(a) and (b), a rectangle R1, a rectangle R2, a line L1, a line L2 and an image I1 are shown as a plurality of objects spanning across the client area A and the client area B. Among them, the rectangles R1 and R2 are displayed pursuant to the above described second invention of the inventive display method. The lines L1 and L2 are displayed pursuant to the above described first invention of the inventive display method. The image I1 is displayed pursuant to the above described third invention of the inventive display method. When the client area B is scrolled from the state before it is scrolled (shown in FIG. 12(a)), the objects cross each other as shown in FIG. 12(b). In this case, the object is displayed with a space inserted in the junction or a mark indicating a crossing affixed in the junction as shown in FIG. 12(b). As seen from FIGS. 12(a) and (b), even if an object is disjoined at the junction by scrolling the client area B and the objects cross each other, the correlation between the objects can be easily understood.

Figure 13:
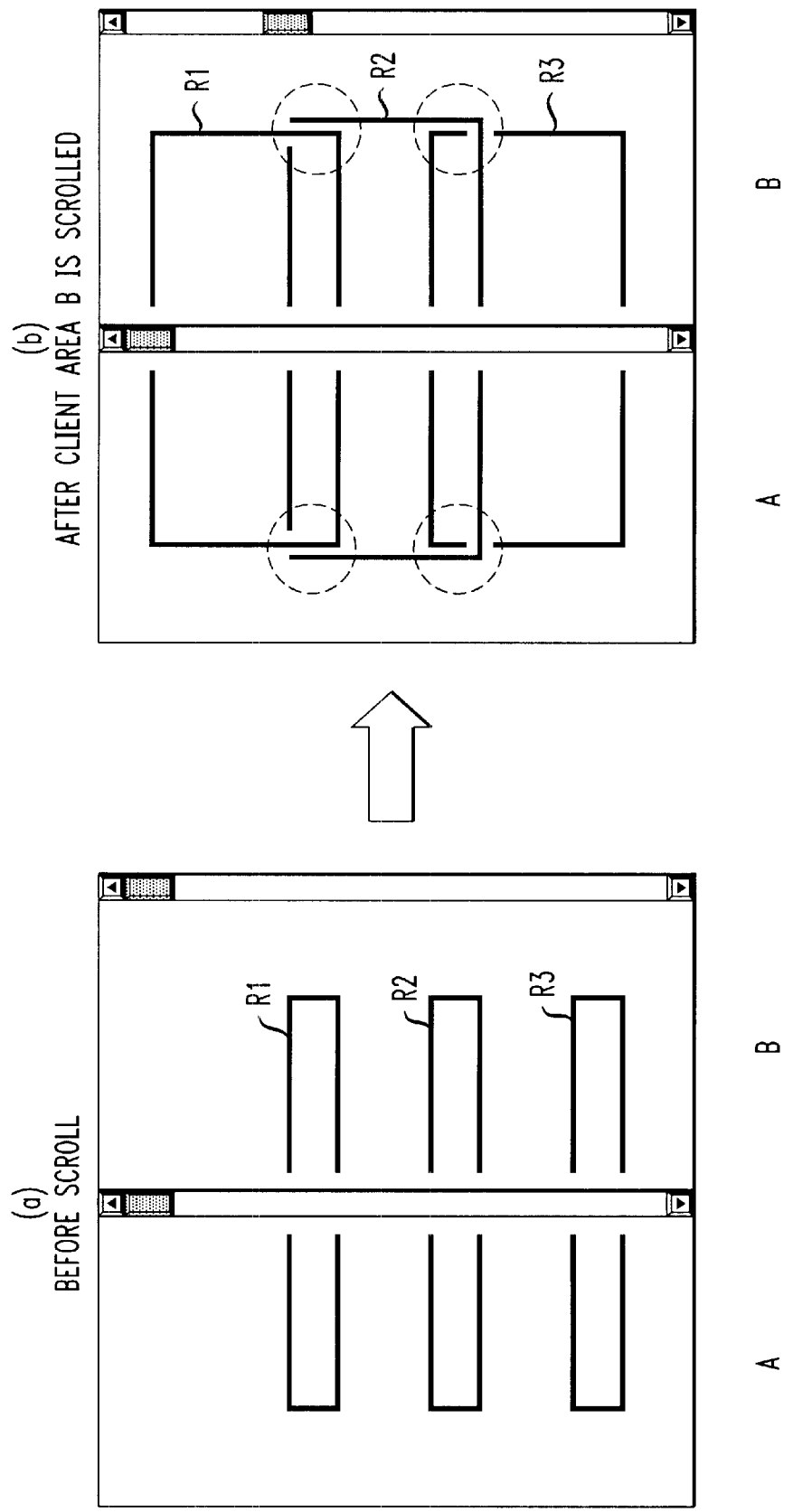
FIG. 13 is a diagram showing an example in which a plurality of objects spanning across a plurality of client areas exist and overlap each other among cases where.

FIG. 13 is a diagram showing an example in which a plurality of objects overlap each other among cases where a plurality of objects spanning across a plurality of client areas exist. The state before being scrolled is shown in FIG. 13(a) while the state after scrolling the client area B is shown in FIG. 13(b). In FIGS. 13(a) and (b), rectangles R1, R2 and R3 are shown as a plurality of objects spanning across the client areas A and B. The rectangles R1, R2 and R3 are displayed pursuant to the second invention of the above described display method. When the client area B is scrolled from the state before it is scrolled (shown in FIG. 13(a)), the objects overlap each other as shown in FIG. 13(b). In this case, the object is displayed with overlapped portion offset as shown in FIG. 13(b). As seen from FIGS. 13(a) and (b), even if object overlap by scrolling the client area B, the correlation between the objects can be easily understood.

Figure 14:
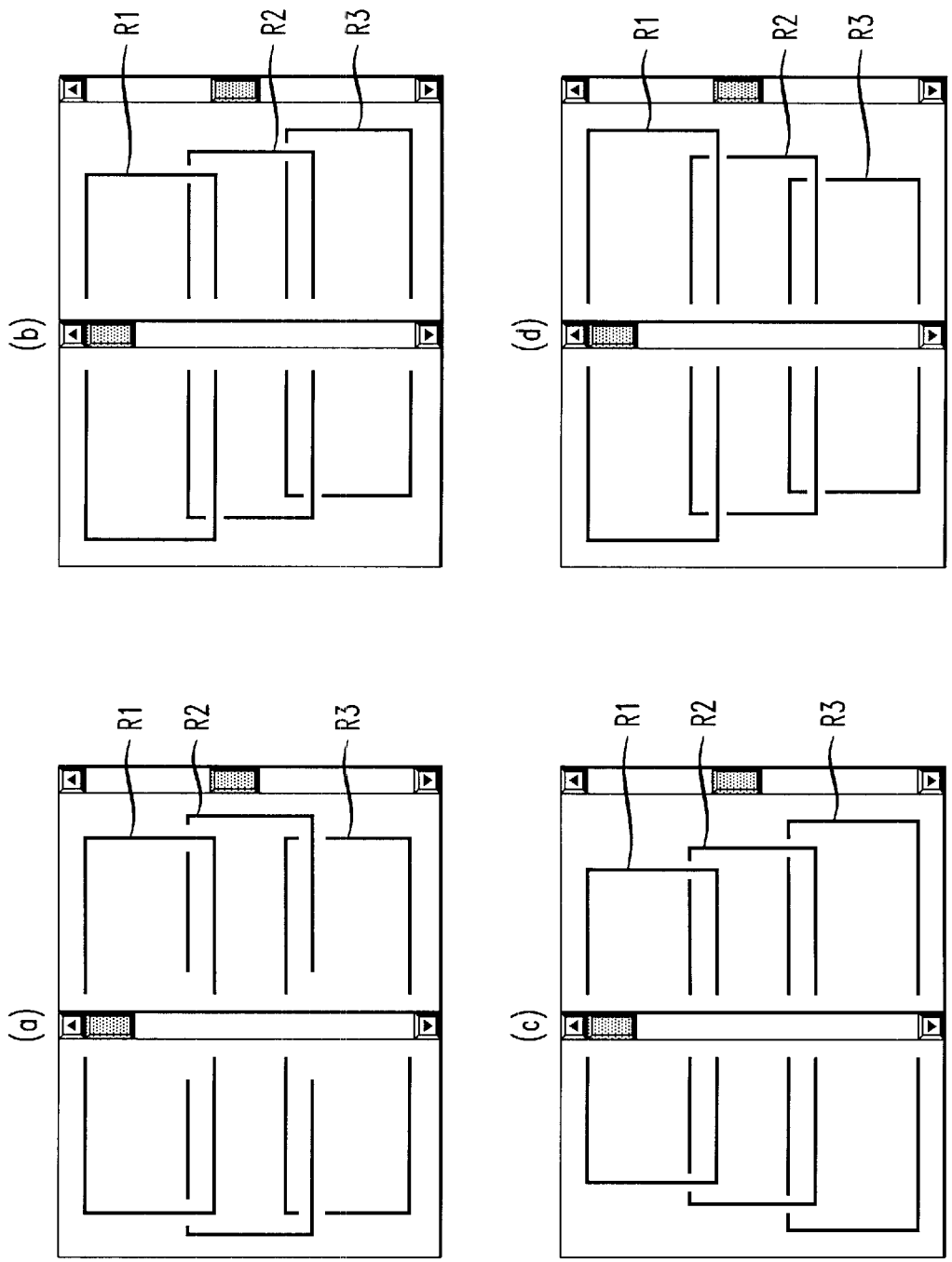
FIG. 14 is a diagram showing an example of offsetting in the example of FIG. 13 where a plurality of objects overlap each other.

FIG. 14 is a diagram showing an example of offsetting in the example of FIG. 13 where a plurality of objects overlap each other. FIG. 14(a) shows an example in which the rectangles. are displayed with the middle rectangle R2 being expanded in width beyond the width of the upper and lower rectangles R1 and R3 which remain in a same width. FIG. 14(b) shows an example in which the rectangles R1, R2 and R3 are displayed with the position shifted one after another to the right by a fixed distance and with a same width. FIG. 14 (c) shows an example in which the upper, middle and lower rectangles R1, R2 and R3 are displayed with the width being expanded one after another. FIG. 14 (d) shows an example in which the upper, middle and lower rectangles R1, R2 and R3 are displayed with the width being reduced one after another. The display method of this invention can be preferably practiced in any example.

Figure 15:
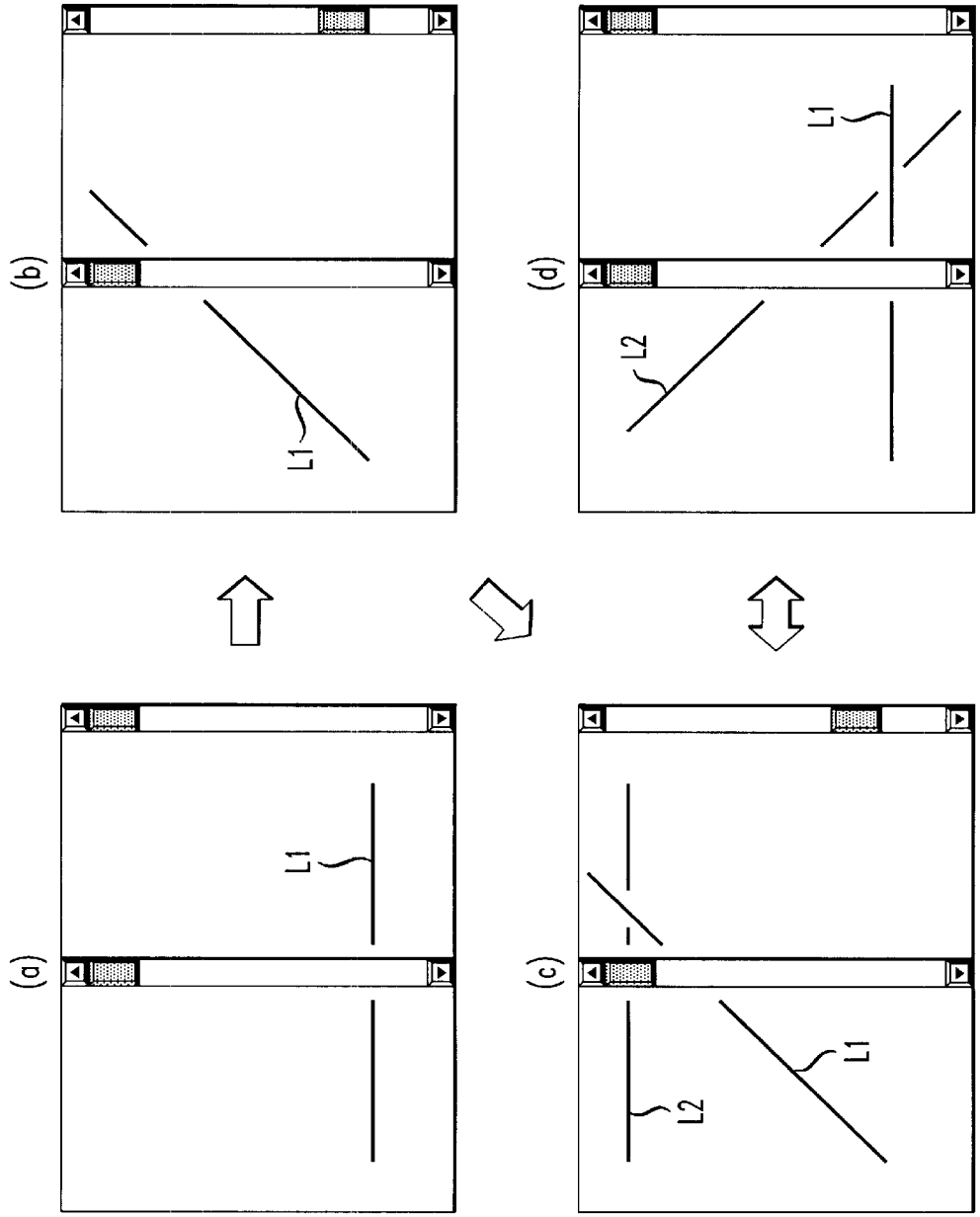
FIG. 15 is a diagram showing adjustment of such object.

A function to adjust the position of a scroll bar so as to restore an object to an initial shape by clicking a part of the object is now described hereunder. FIG. 15 is a diagram showing adjustment of such object. As shown in FIG. 15(a), a line L1 is rendered as an object spanning across the client areas A and B. It is assumed that the line L1 is displayed pursuant to the first invention of the inventive display method. When the client area B is scrolled to a large extent from the state of FIG. 15(a), the state shown in FIG. 15(b) is resulted. In the state shown in FIG. 15(b), a line L2 is rendered as a new object spanning across the client areas A and B. When the line L1 in the client area A is clicked in this state, the line L1 returns to the initial state as shown in FIG. 15(d). If the line L2 is clicked in the state of FIG. 15(d), the object returns to the initial state, i.e., the state of FIG. 15(c) The above described function is preferable in restoring the position and the shape of complicatedly entangled objects as shown in FIG. 12 through FIG. 14 to the initial state because the objects can be easily restored to the initial state. Further, the above described function is also preferable in aligning the position and the shape of an object which moves out of a client area by a large scrolling because the objects can be easily aligned to the initial state.

Figure 16:
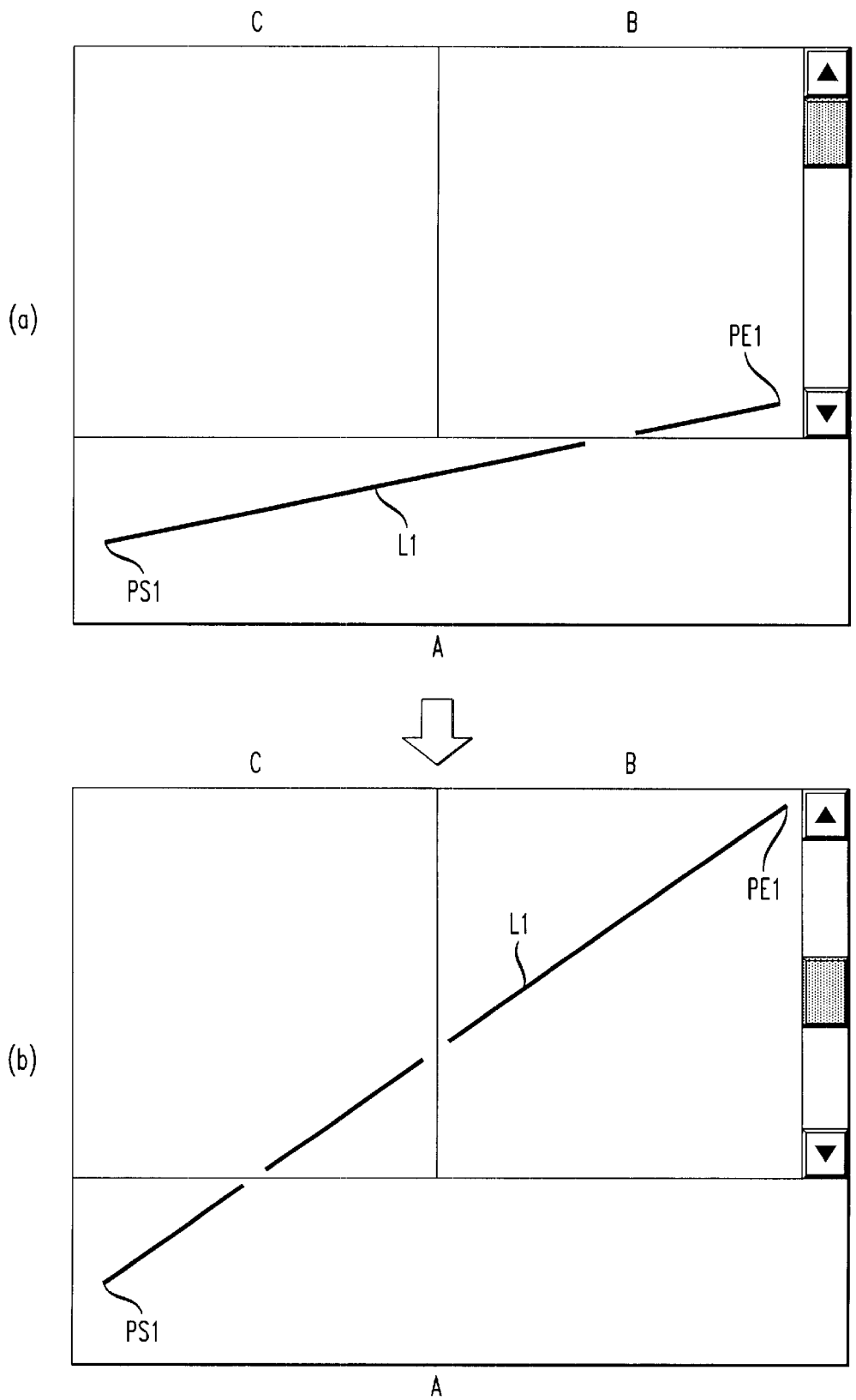
FIG. 16 is a diagram showing an example in which the number of client areas spanned across increases.

An example in which the number of client areas spanned across increases is now described with reference to FIG. 16. As shown in FIG. 16(a), a case where a line L1 spanning between the client areas A and B is rendered when client areas A through C exist is considered. It is assumed here that the line L1 is displayed pursuant to the first invention of the inventive display method. When the client area B is scrolled in this state, a case may take place where the line L1 spans across the client area C which was not initially spanned across by the line L1. In this case, the correlation between the starting point PS1 and the end point PE1 of the line L1 can be easily understood by rendering the line L1 also in the client area C. While a scroll bar exists in the client area B and makes it to be a scrollable area, a scroll bar does not exist in the client areas A and C so that they are not scrollable areas in the example shown in FIG. 16. This invention is preferably applicable to a case where there is a client area which is not scrollable as seen in the example shown in FIG. 16.

Figure 17:
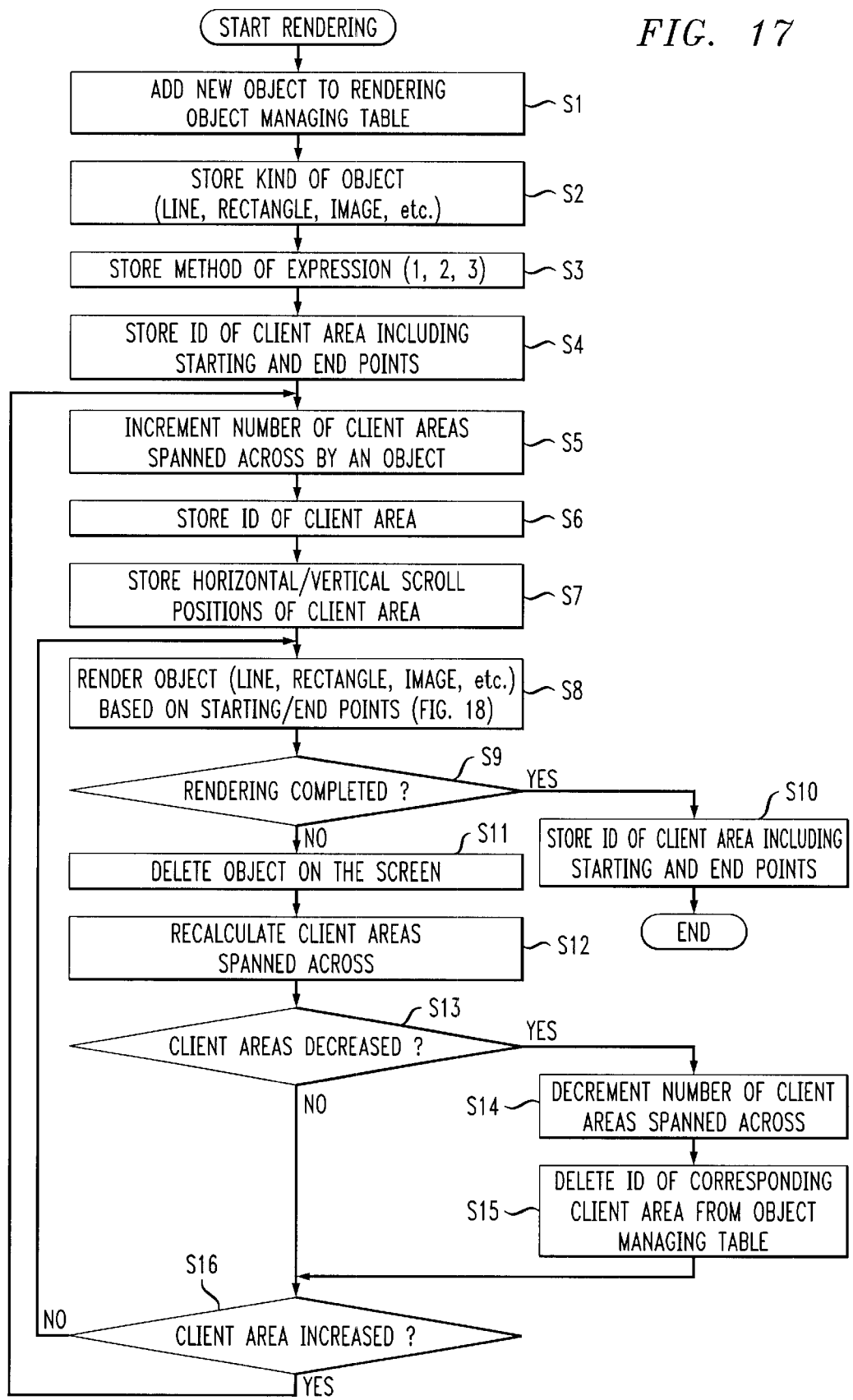
FIG. 17 is a flow chart showing an example of rendering an object spanning across a plurality of client areas.

A method of rendering an object spanning across a plurality of client areas as used in the display method of this invention is now described hereunder. FIG. 17 is a flow chart showing an example of rendering an object spanning across a plurality of client areas. In explaining according to the flow chart of FIG. 17, information of a new rendering object is at first stored in the rendering object managing table described in FIG. 3. Specifically, a new object is added to the rendering object managing table (S1), the kind of object (line, rectangle, image, etc.) is stored (S2), method of expression (1, 2, 3) is stored (S3), a starting point and an ID of the client area including the starting point is stored (S4), a starting point and the number of client areas which include the starting point (the number of areas is incremented each time a loop passes) is stored (S5), an ID of the client area is stored (S), and horizontal and vertical scroll positions of the client area are stored (S7) in the rendering object managing table. The methods of expression 1 through 3 correspond to the first to the third inventions of the inventive display method, respectively in this context.

An object is then rendered based on the starting and the end points (S8). The method of rendering the object will be described later with reference to FIG. 18. The end of rendering is determined in step (S9). When the determination is the end of rendering, an ID of the client area including the starting and the end points is stored in the rendering object managing table (S10) and rendering ends. When the determination in the step (S9) is rendering not completed, the object on the screen is deleted (S11) and number of client areas spanned across are recalculated (S12). An increase or a decrease of the number of the client areas is then determined. When it is determined that the number of client areas decreases in step (S13), the number of client areas spanned across is decremented by the number of decrease in the rendering object managing table (S14), the ID of a decreased client areas is deleted from the rendering object managing table (S15), returning to the step (S8) via step (S16), and the steps of and after rendering the object are repeated based on the starting and the current points. When it is determined that the number of client areas increases in step (S16), the flow returns to the step (S5), the number of client areas which an object spans across is incremented by the number of increase, and the following steps are repeated. Rendering an object spanning across a plurality of client areas is completed by the above flow.

Figure 18:
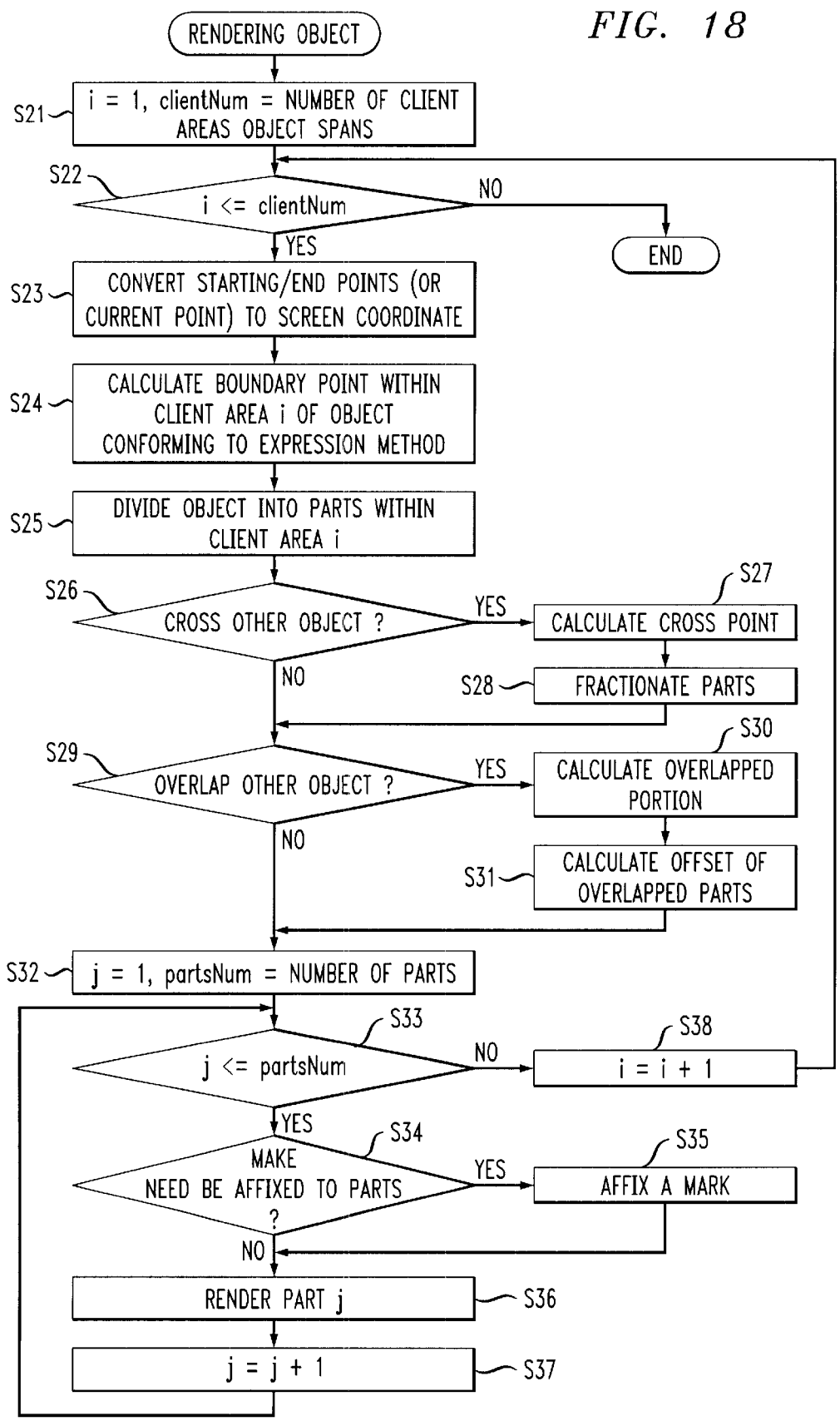
FIG. 18 is a flow chart showing an example of method of rendering the object.

FIG. 18 is a flow chart showing an example of a method of rendering an object used in various processing. In explaining rendering of an object according to the flow chart of FIG. 18, in step (S21), i is substituted with 1 and clientNum is substituted with the number of client areas which an object spans across. In step (S22), i is compared with clientNum and the flow ends if i is greater than clientNum. If i is equal to or smaller than clientNum, the starting point and the end point (or current point) are converted to screen coordinates. A boundary point within a client area i of the object conforming to the method of expression is then calculated (S24). The object is then divided into parts within the client area i (S25).

It is then determined whether or not there is a crossing point with other object in step (S26). When it is determined that there is a crossing point, the crossing point is calculated (S27), and the parts are fractionated (S28). When it is determined that there is no crossing point or after is determined that there is a crossing point and the parts are fractionated in the step (S28), it is further determined whether or not there is an overlap with other object in step S(29). When it is determined that there is an overlap, an overlapped portion is calculated (S30) and the offset of the overlapped parts is calculated (S31). When there is no overlap or after it is determined that there is an overlap and the offset is calculated in the step (S31), j is substituted with 1 and partsNum is substituted with the number of fractionated parts (S32). j is then compared with partsNum in step (S33). If j is equal to or smaller than partsNum, it is then determined whether or not it is necessary to add a mark to the parts in step (S34). When it is not necessary to add a mark or after a mark is added when it is necessary to add a mark (S35), the part j is rendered (S36) and j is incremented by substituting j with j+1 (S37). By rendering all the parts, j becomes larger than partsNum in step (S33). In that case, i is incremented by substituting it with i+1(S38), returning to the comparison of i with partsNum in the step (S22), and the flow ends or the steps thereafter are repeated depending on the result of the comparison.

Figure 19:
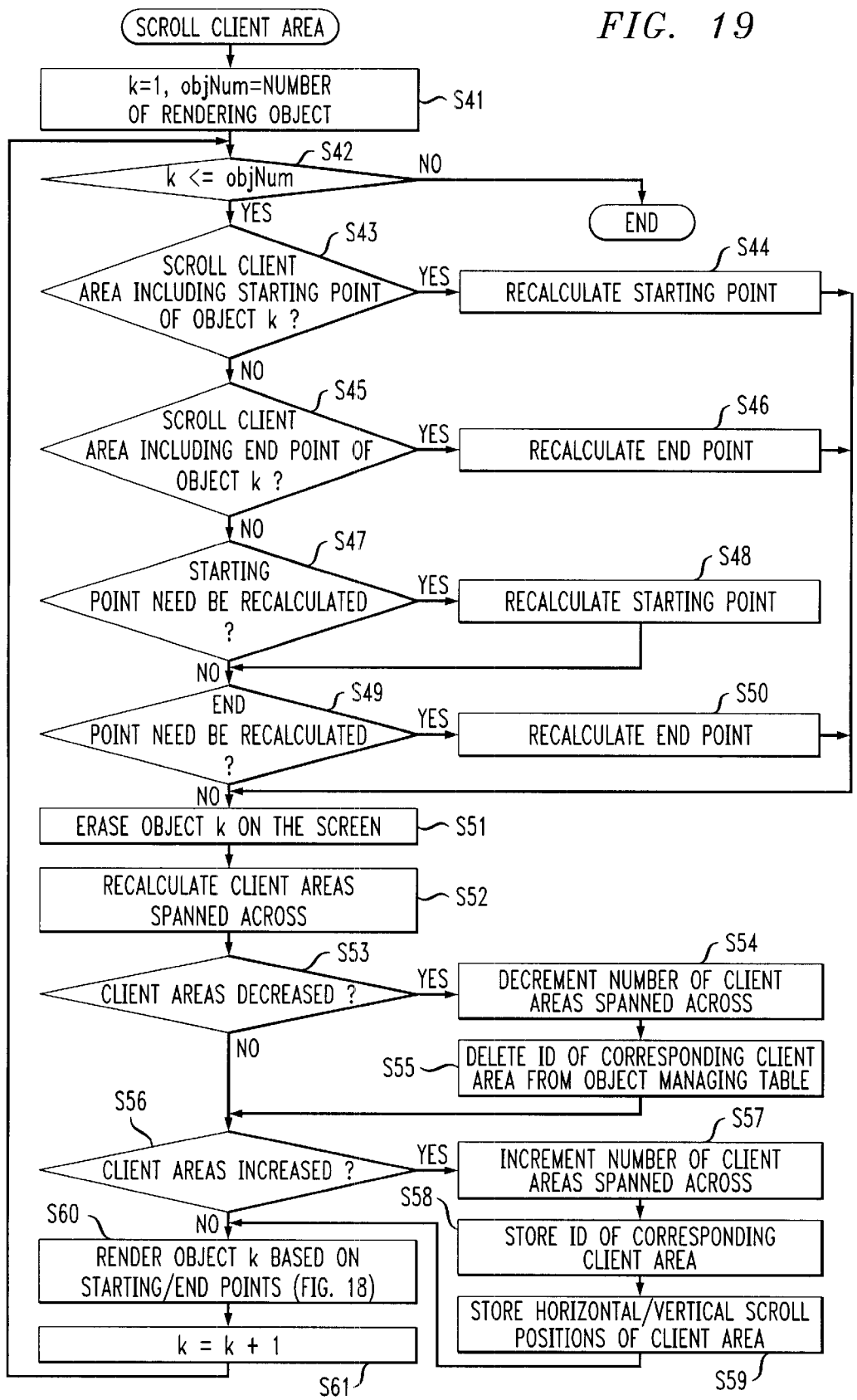
FIG. 19 is a flow chart showing an example of a method of rerendering following scrolling.

FIG. 19 is a flow chart showing an example of a method of re-rendering following scrolling. In explaining the method of re-rendering following scrolling according to the flow chart of FIG. 19, when scrolling of a client area is detected as an external event, k is substituted with 1 and objNum is substituted with the number of rendering objects in step (S41). k is then compared with objNum in step (S42) and the flow ends if k is greater than objNum. If k is equal to or smaller than objNum, a starting point and an end point is recalculated in the recalculating part. Specifically, it is determined whether or not a client area including the starting point of an object k is scrolled in step (S43). When a client area including the starting point of an object k is scrolled, the starting point is recalculated (S44) and the flow goes out of the recalculating part. When the scroll is not for a client area including the starting point of an object k, it is determined whether or not a client area including the end point of an object k is scrolled.

When a client area including the end point of an object k is scrolled, the end point is recalculated (S46) and the flow goes out of the recalculating part. When the scroll is not for a client area including the end point of an object k, it is determined whether or not the starting point need be recalculated in step (S47). When the starting point need be recalculated, the starting point is recalculated (S48). When the starting point need not be recalculated or after the starting point is recalculated when the starting point need be recalculated, it is determined whether or not recalculation of the end point is necessary in step (S49). When it is necessary to recalculate the end point, the end point is recalculated (S50). When it is not necessary to recalculate the end point or after the end point is recalculated when it is necessary to recalculate the end point, the flow goes out of the recalculating part of the starting point and the end point.

After going out of the recalculating part, the object k on the screen is erased in step (S51). After the number of the client areas spanned across is recalculated (S52), it is determined whether or not the number of the client areas decreases in step (S53). When it is determined that the number of the client areas decreases, the number of client areas spanned across is decremented on the rendering object managing table (S54) and the ID of the corresponding client area is deleted from the rendering object managing table (S55). When it is determined that the number of the client areas does not decrease or after it is determined that the number of the client areas decreases and the steps (S54) and (S55) have been executed, it is determined whether or not the number of client areas increases in step (S56). When it is determined that the number of client areas increases, the number of client areas spanned across is incremented on the rendering object managing table (S57), the ID of the corresponding client area is stored in the rendering object managing table (S58), and the horizontal and vertical scroll positions of the client area are stored in the rendering object managing table (S59). When it is determined that the number of client areas does not increases or after it is determined that the number of the client areas increases and the steps (S57), (S58) and (S59) have been executed, the object k is rendered based on the starting point and the end point. The rendering of the object k is same as the rendering of the object described with reference to FIG. 18. When rendering of the object k has been completed, k is substituted with k+1 to increment k (S61), returning to the step (S42), and the flow ends or the steps thereafter are repeated depending on the result of the comparison.

Figure 20:
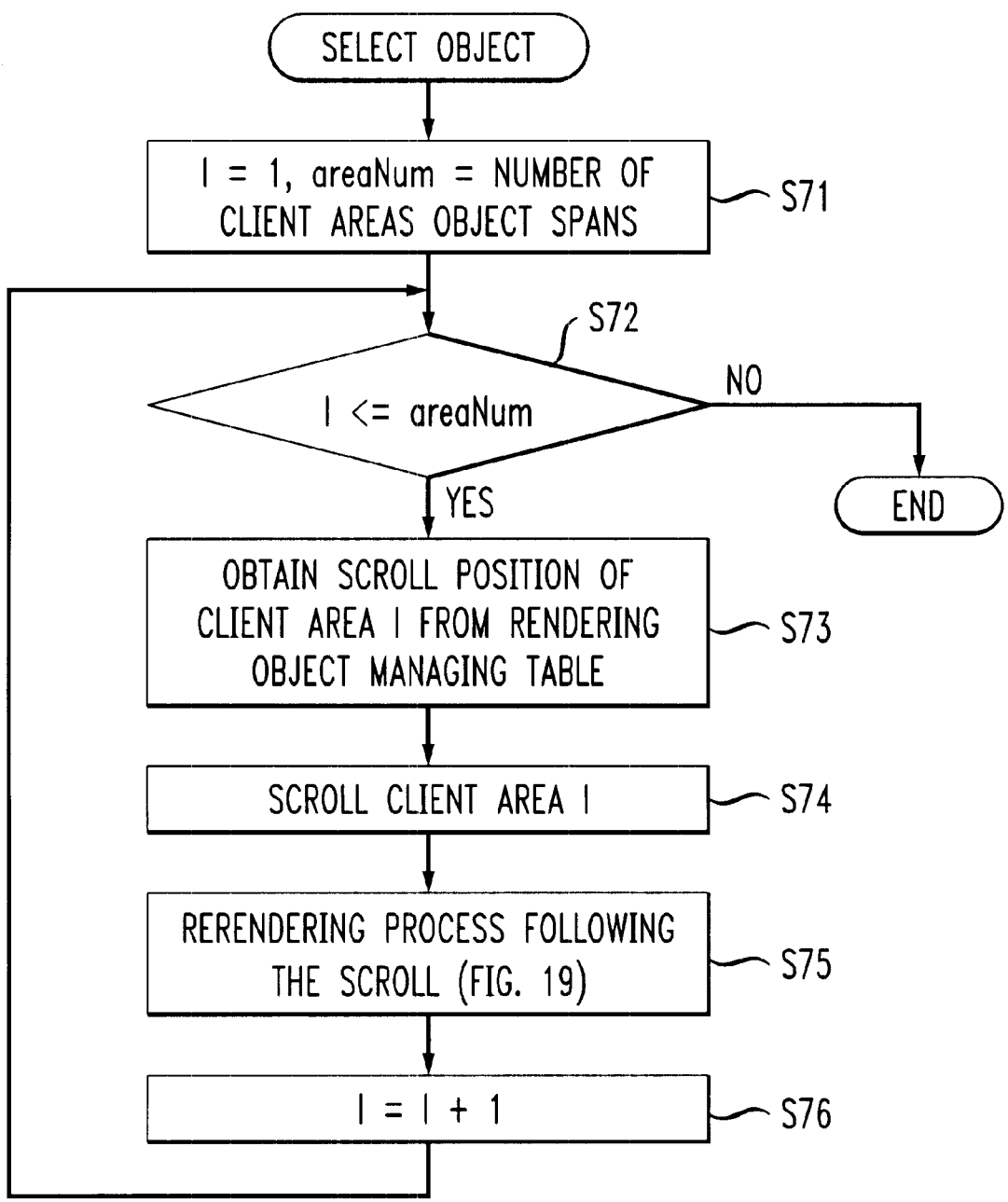
FIG. 20 is a flow chart showing an example of a method of adjusting the position of an object.
Figure 21:
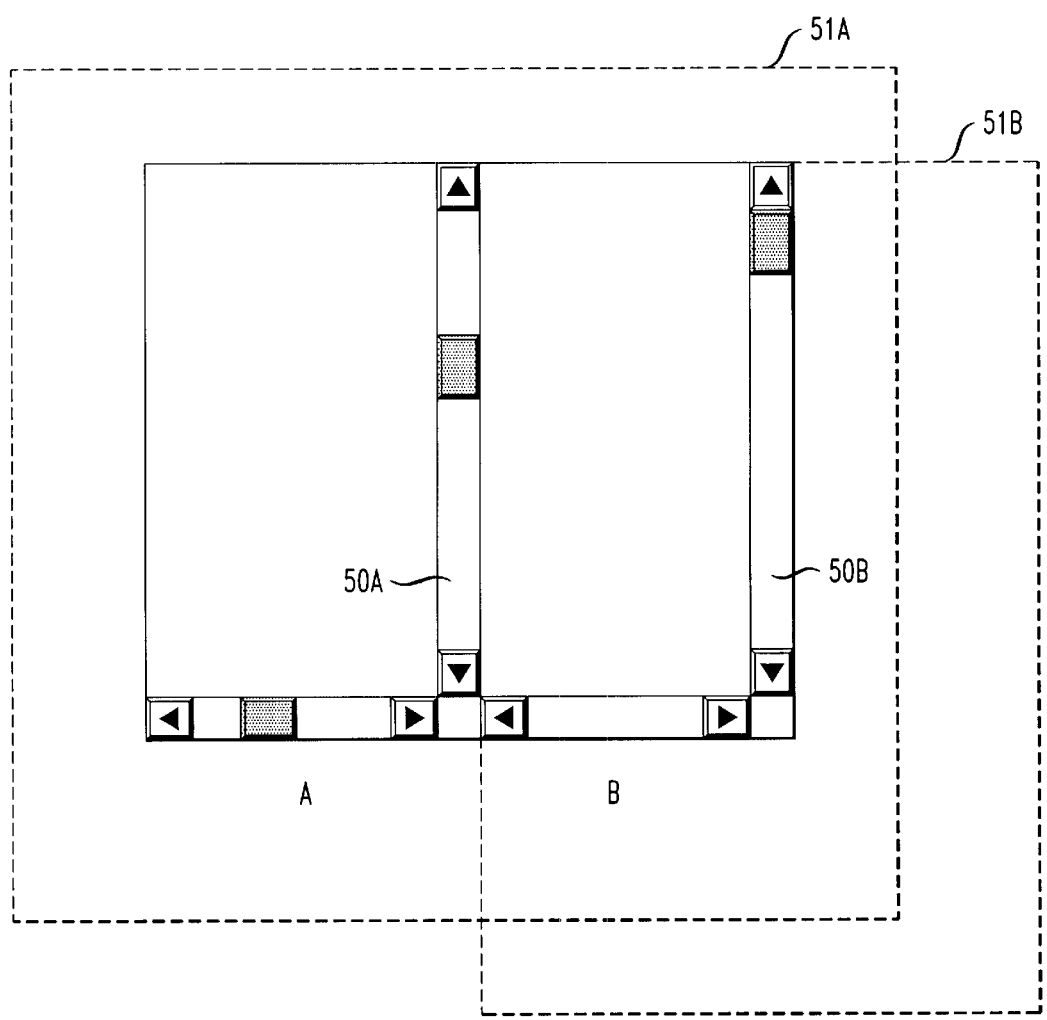
FIG. 21 is a diagram for explaining a plurality of client areas.
Figure 22:
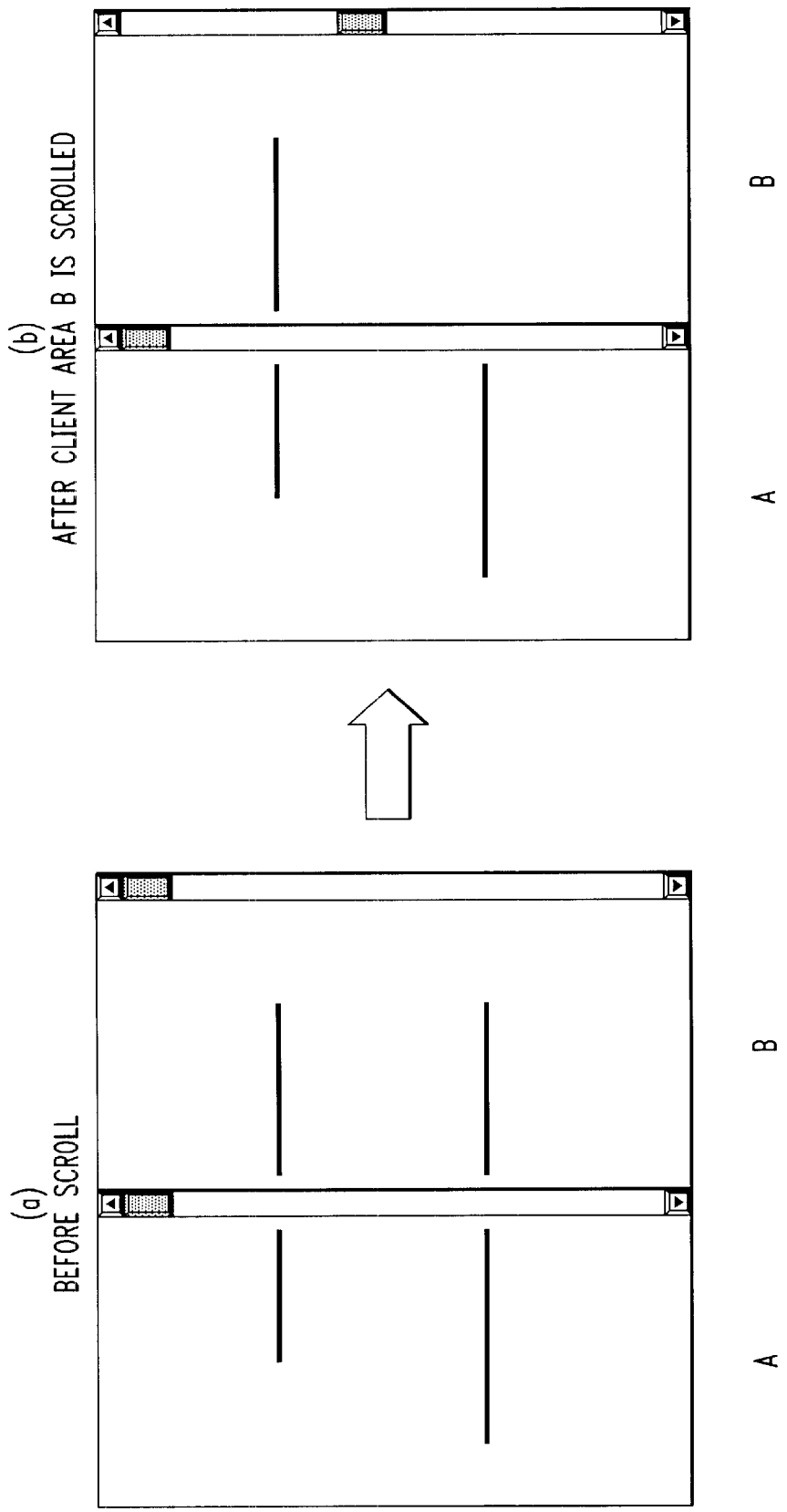
FIG. 22 is a diagram for explaining a problem in a case in which an object is a line connecting related points.
Figure 23:
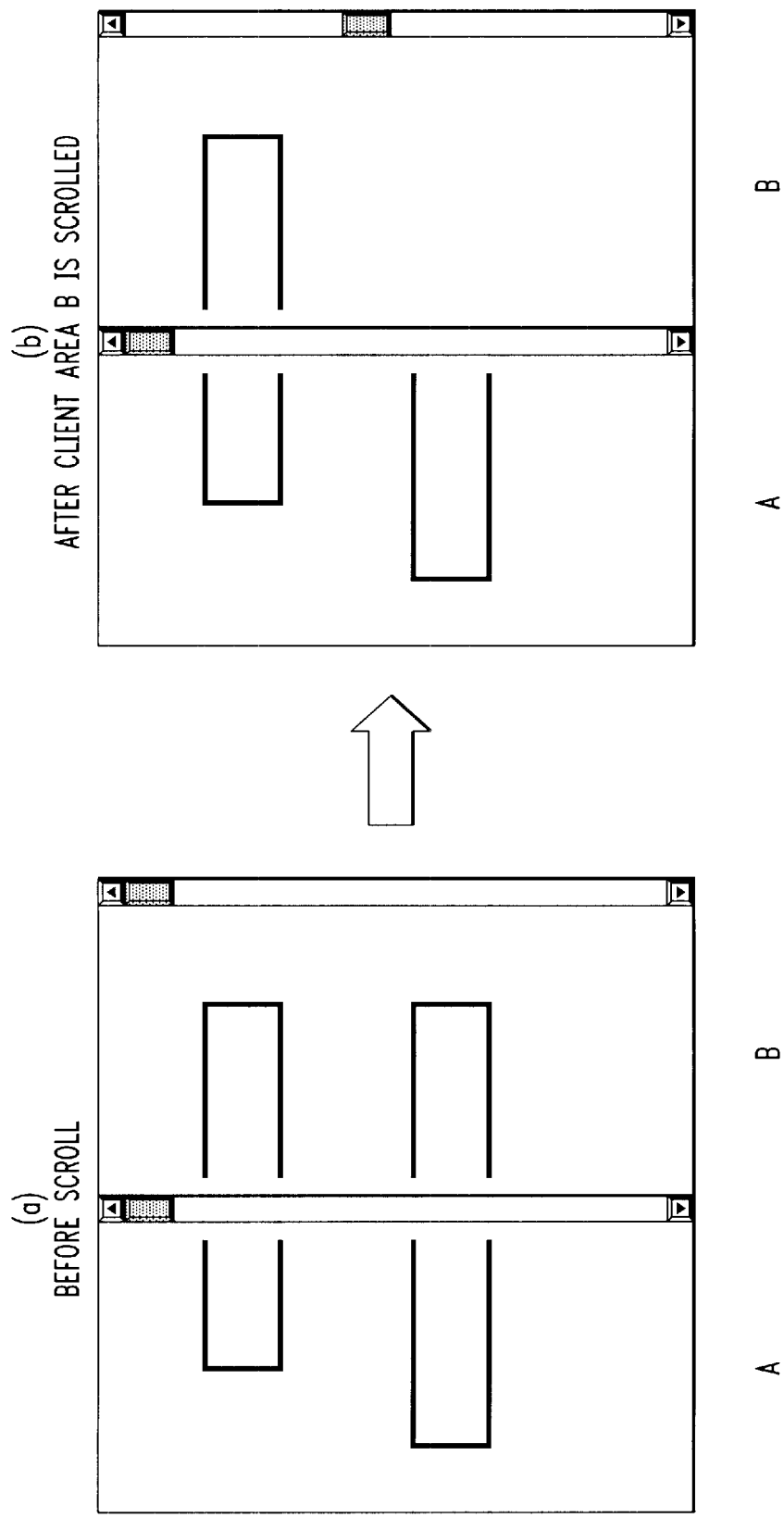
FIG. 23 is a diagram for explaining a problem in a case in which an object is a figure encompassing related areas.
Figure 24:
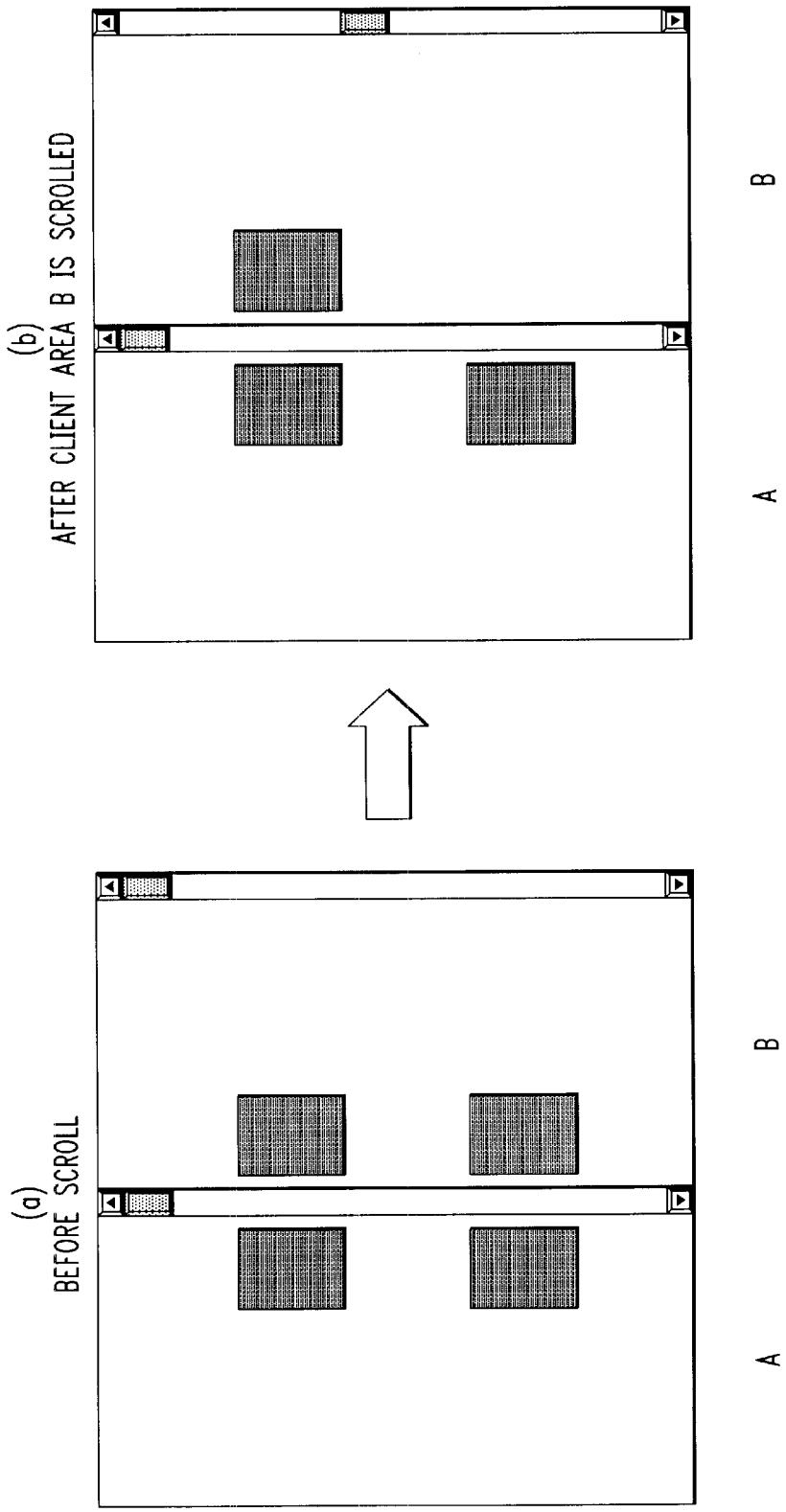
FIG. 24 is a diagram for explaining a problem in a case in which an object is an image.
Figure 25:
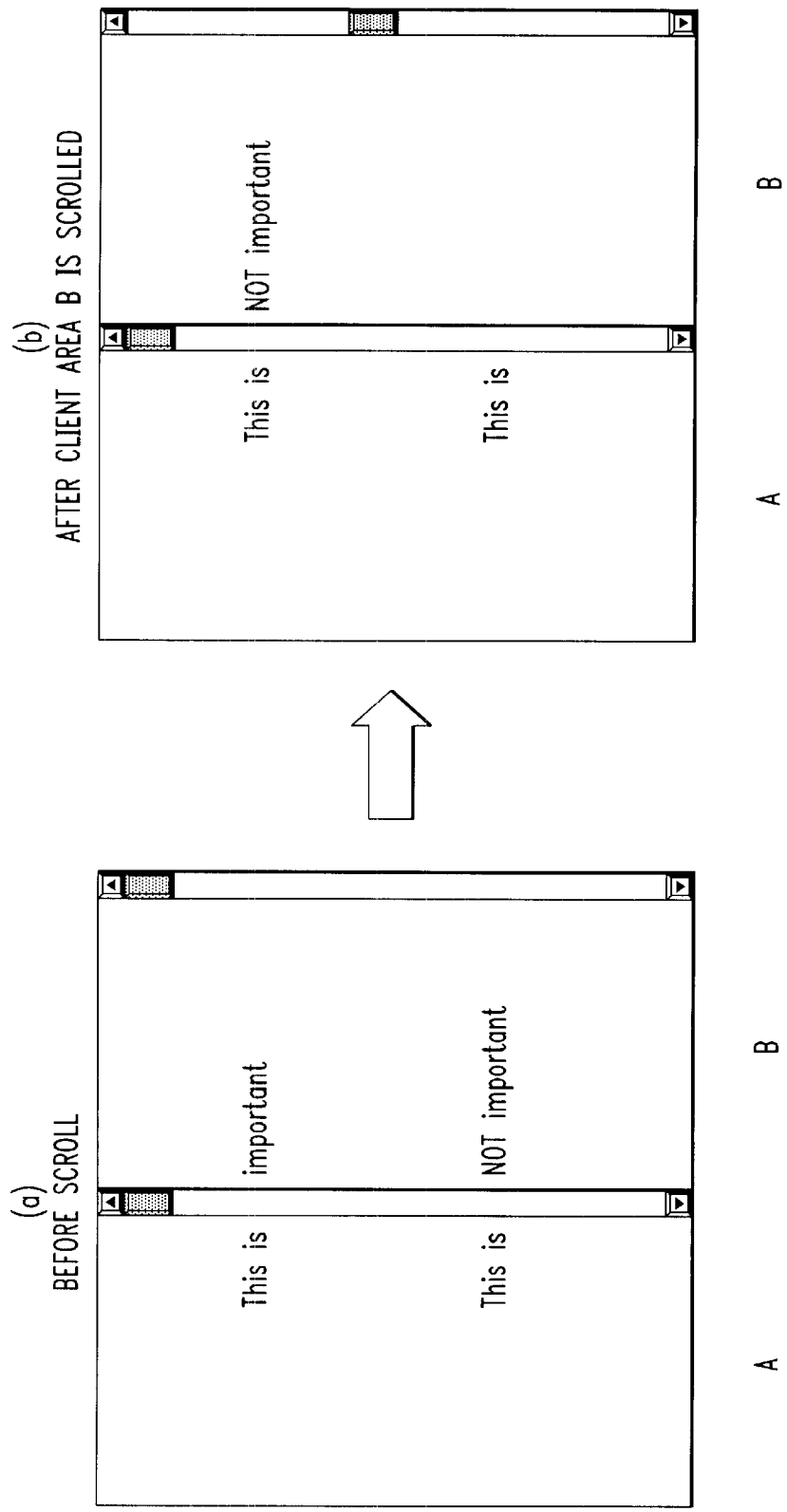
FIG. 25 is a diagram for explaining a problem in a case in which an object is a character string.

FIG. 20 is a flow chart showing an example of a method of adjusting the position of an object. In explaining the method of adjusting the position of an object according to the flow chart of FIG. 20, by selecting an object to be clicked, l is substituted with 1 and areaNum is substituted with the number of client areas across which the object spans (S71). l is then compared with areaNum in step (S72) and the flow ends if l is greater than areaNum. When l is equal to or less than areaNum, the scroll position of the client area l is obtained from the rendering object managing table (S73) to scroll the client area l (S74). A re-rendering following scrolling is then processed (S75). The re-rendering process is same as the re-rendering process following scrolling described with reference to FIG. 19. When re-rendering process has been completed, l is substituted with l+1 to increment l (S76), returning to the step (S71), and the flow ends or the steps thereafter are repeated depending on the result of the comparison.

It is apparent that, in a method of displaying objects in a plurality of client areas relate to a method in which a plurality of independent client areas exist and at least one the client areas independently scrolls, this invention displays a relationship between objects displayed in a plurality of client areas the relative position of which is changed by scrolling a client area. by following the movement caused by scrolling in the first invention, by enlarging the object by the amount of movement caused by scrolling in the second invention, and by marking a junction between objects in scrolling in the third invention: The correlation of objects displayed in a plurality of client areas can thus be visually understood at a glance easily.

It is to be understood that the embodiments and variations shown and described herein are merely illustrative of the principles of this invention and that various modifications may be implemented by those skilled in the art without departing from the scope and spirit of the invention.

What is claimed is:

1. A method for displaying a relationship between objects displayed in a plurality of client areas, wherein at least one the client areas independently scrolls, said method comprising the step of:

receiving an indication of a change of the relative position of said objects by scrolling a client area; and following the movement caused by said scrolling by inclining said object based on an amount of movement caused by said scrolling.

2. The display method of claim 1, wherein said object displayed in the plurality of client areas is a line connecting related points and said step of following the movement caused by scrolling is displayed by reconnecting the points moved by the scrolling.

3. The method of claim 1, wherein said object displayed in the plurality of client areas is a figure or a character string encompassing related areas and said step of following the movement caused by scrolling is displayed by inclining the area or the character string by the amount of movement caused by the scrolling.

4. The method of claim 1, wherein at least two of said plurality of objects cross each other by scrolling, and further comprising the step of displaying said objects with a space inserted in the crossing point or a mark indicating a crossing affixed to the crossing point.

5. The method of claim 1, wherein at least two of said plurality of objects overlap each other by scrolling, and further comprising the step of displaying said overlapping objects by offsetting the overlapped portion.

6. The method of claim 1, wherein said object is displayed by being returned to an initial shape assumed at the time when the scroll position of an object is correlated by clicking a part of the object.

7. The method of claim 1, wherein said object is displayed also in the new client area when the display of said object spans into a new client area by scrolling a client area.

8. A method for displaying a relationship between objects displayed in a plurality of client areas, wherein at least one the client areas independently scrolls, said method comprising the step of:

receiving an indication of a change of the relative position of said objects by scrolling a client area; and enlarging or reducing the object by the amount of movement caused by the scrolling.

9. The method of claim 8, wherein said object displayed in the plurality of client areas is a figure encompassing related areas and said enlarging or reducing step enlarges or reduces the area by the amount of movement caused by the scrolling.

10. The method of claim 8, wherein at least two of said plurality of objects cross each other by scrolling, and further comprising the step of displaying said objects with a space inserted in the crossing point or a mark indicating a crossing affixed to the crossing point.

11. The method of claim 8, wherein at least two of said plurality of objects overlap each other by scrolling, and further comprising the step of displaying said overlapping objects by offsetting the overlapped portion.

12. The method of claim 8, wherein said object is displayed by being returned to an initial shape assumed at the time when the scroll position of an object is correlated by clicking a part of the object.

13. The method of claim 8, wherein said object is displayed also in the new client area when the display of said object spans into a new client area by scrolling a client area.

14. A method for displaying a relationship between objects displayed in a plurality of client areas, wherein at least one the client areas independently scrolls, said method comprising the step of:

receiving an indication of a change of the relative position of said objects by scrolling a client area; and marking a junction between the objects when the objects are scrolled.

15. The method of claim 14, wherein said object displayed in the plurality of client areas is an image and said step of marking the junction is displayed by affixing a convex and a concave of complementary shape to the junction of the objects.

16. The method of claim 14, wherein said object displayed in the plurality of client areas is a character string and said step of marking of the junction is displayed by affixing a line of a same color to the junction of the objects.

17. The method of claim 14, wherein said object displayed in the plurality of client areas is a figure encompassing related areas and said step of marking of the junction is displayed by affixing a mark of a same shape and color to the junction of the objects.

18. The method of claim 14, wherein at least two of said plurality of objects cross each other by scrolling, and further comprising the step of displaying said objects with a space inserted in the crossing point or a mark indicating a crossing affixed to the crossing point.

19. The method of claim 14, wherein at least two of said plurality of objects overlap each other by scrolling, and further comprising the step of displaying said overlapping objects by offsetting the overlapped portion.

20. The method of claim 14, wherein said object is displayed by being returned to an initial shape assumed at the time when the scroll position of an object is correlated by clicking a part of the object.

21. The method of claim 14, wherein said object is displayed also in the new client area when the display of said object spans into a new client area by scrolling a client area.

22. A system for displaying a relationship between objects displayed in a plurality of client areas, wherein at least one the client areas independently scrolls, said system comprising:

a memory that stores computer-readable code; and a processor operatively coupled to said memory, said processor configured to implement said computer-readable code, said computer-readable code configured to:

receive an indication of a change of the relative position of said objects by scrolling a client area; and follow the movement caused by said scrolling by inclining said object based on an amount of movement caused by said scrolling.

* * * * *